Figure 7:
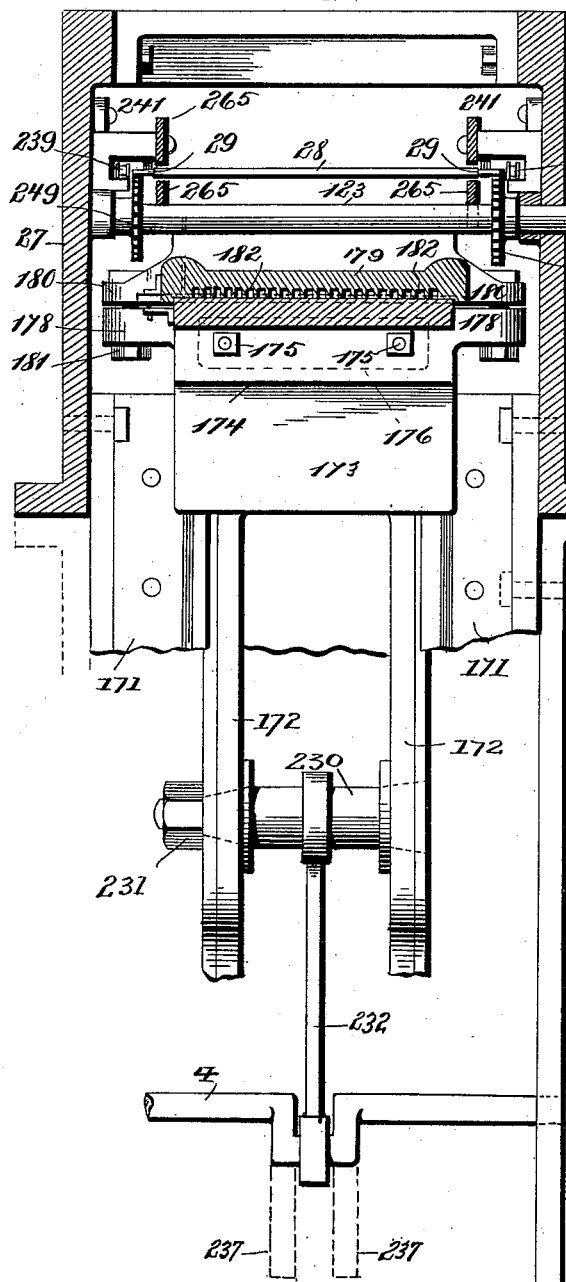

No. 606,994. Patented July 5, 1898.
A. KELLEY.
MATCH MAKING MACHINE.
(Application filed May 22, 1896.)
(No Model.) 13 Sheets—Sheet 1.
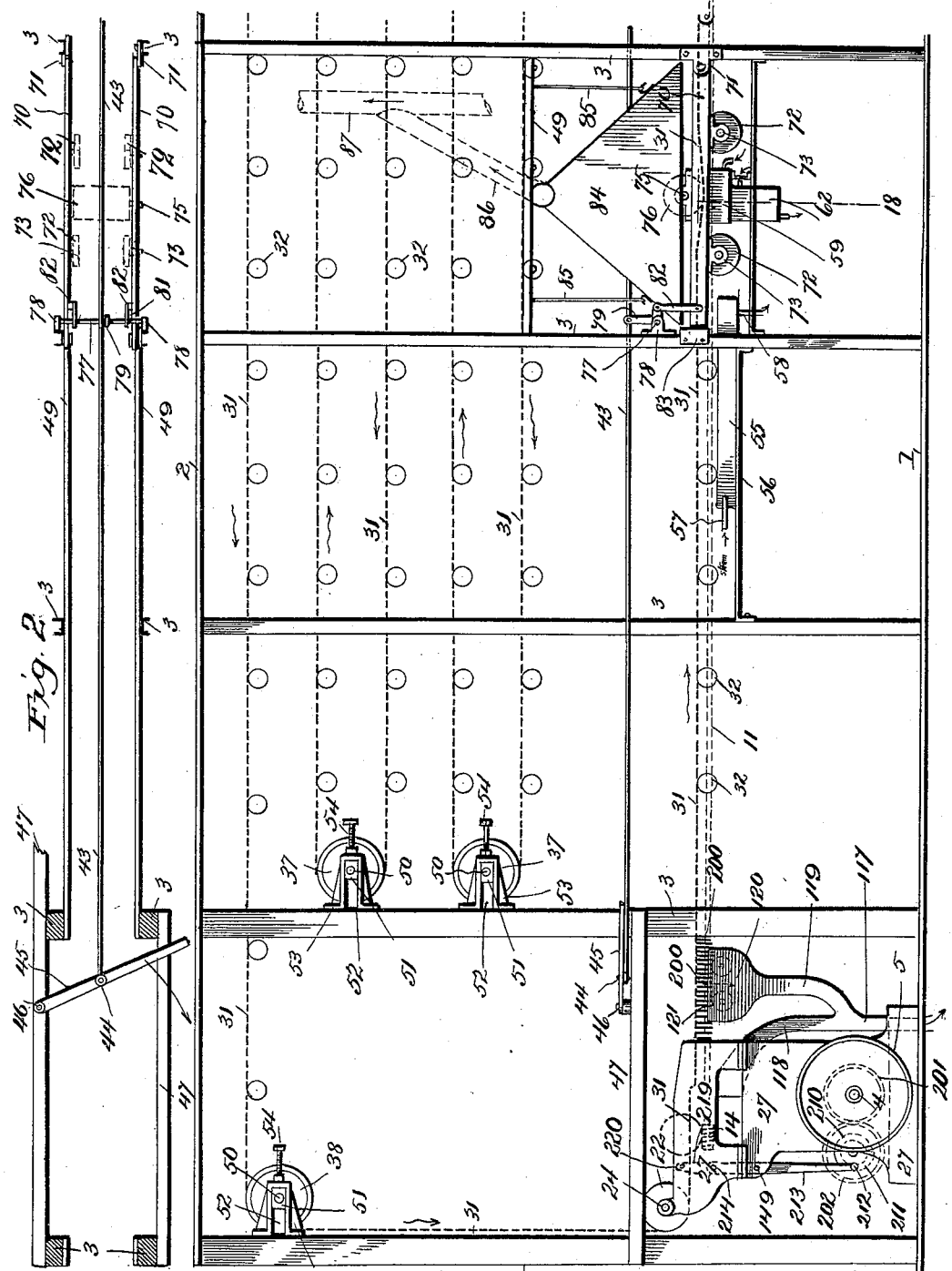

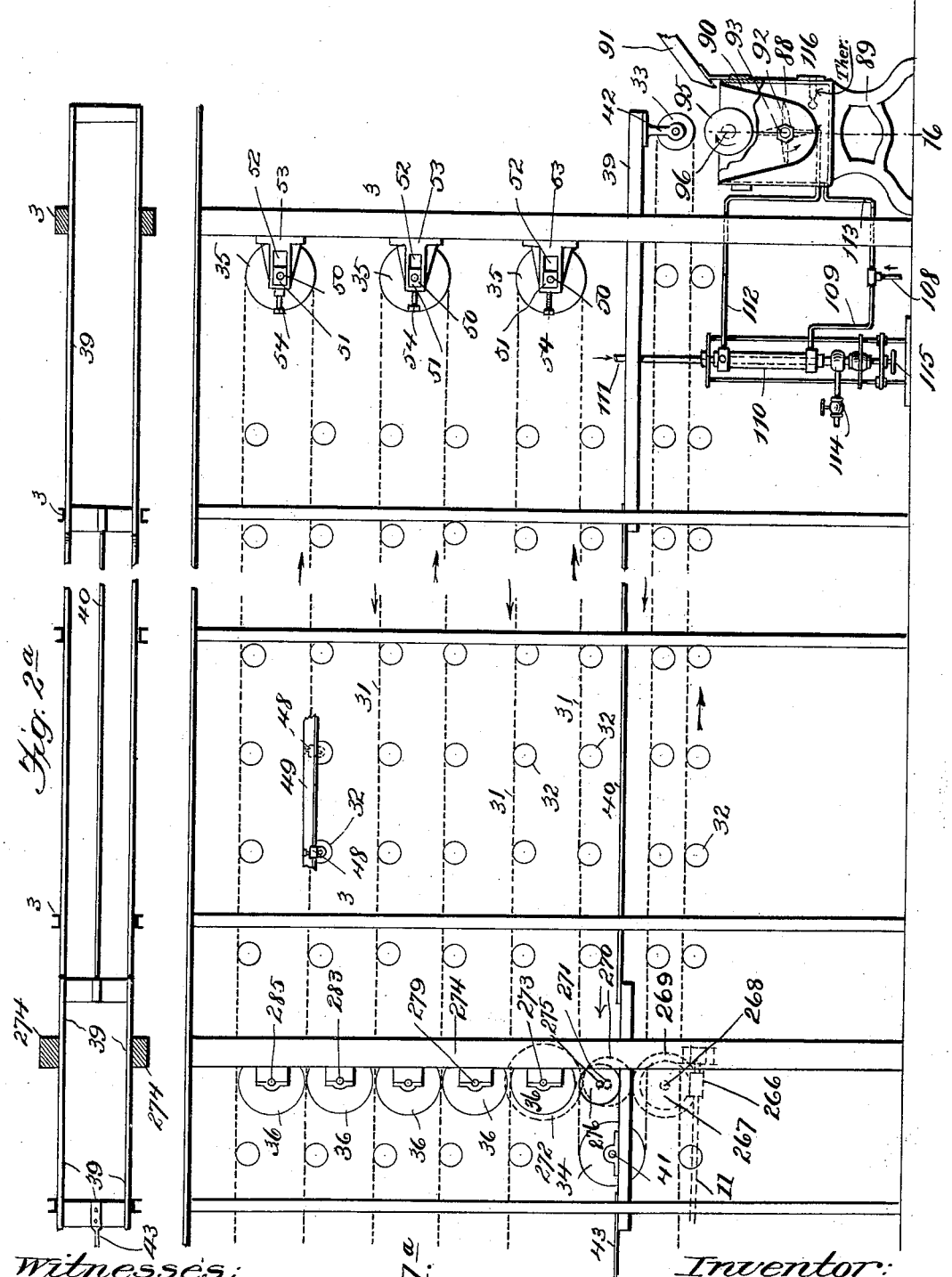

No. 606,994. Patented July 5, 1898.
A. KELLEY.
MATCH MAKING MACHINE.
(Application filed May 22, 1896.)
(No Model.) 13 Sheets—Sheet 3.
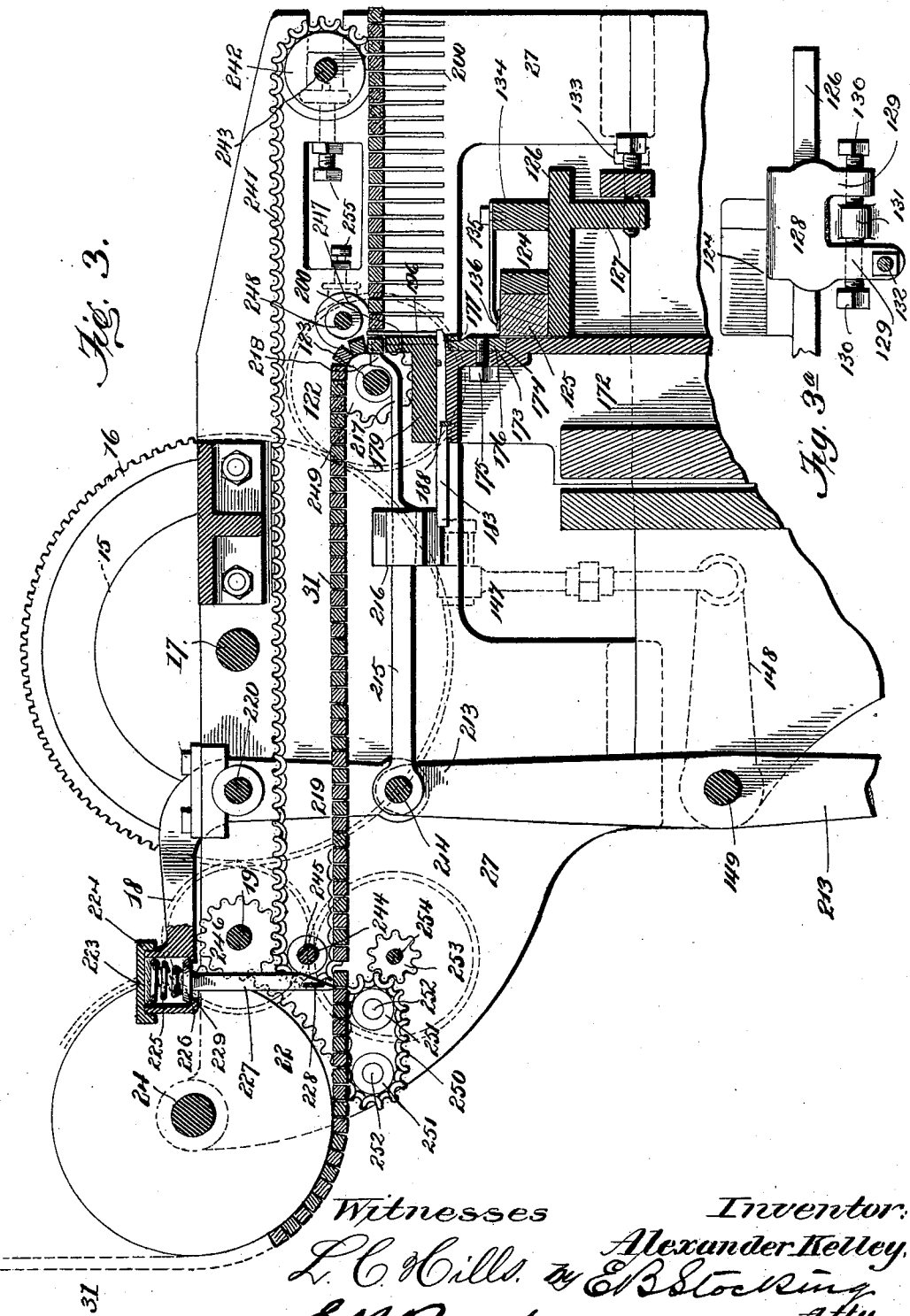

No. 606,994. Patented July 5, 1898.
A. KELLEY.
MATCH MAKING MACHINE.
(Application filed May 22, 1896.)
(No Model.) 13 Sheets—Sheet 4.
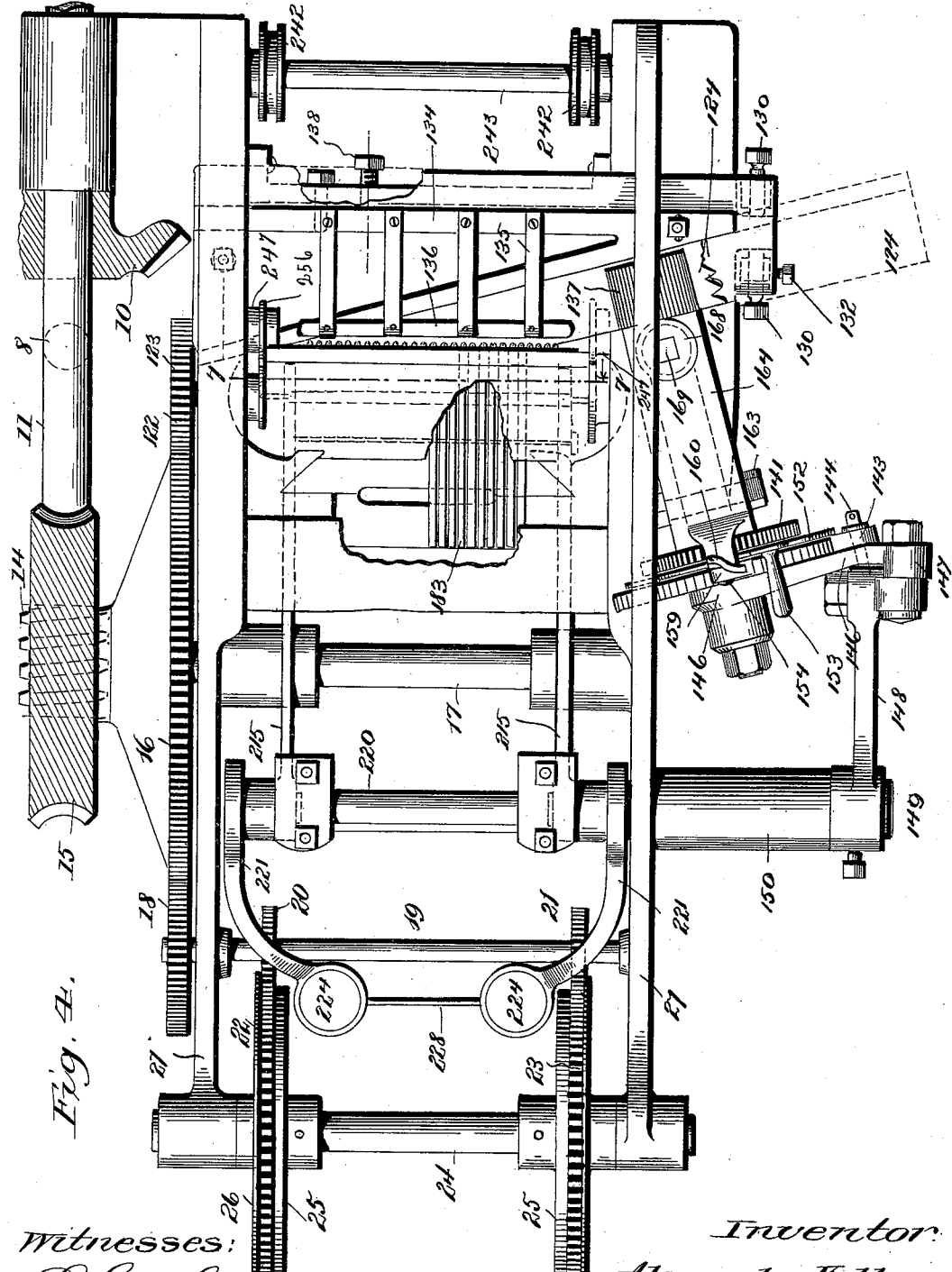

No. 606,994. Patented July 5, 1898.
A. KELLEY.
MATCH MAKING MACHINE.
(Application filed May 22, 1896.)
(No Model.) 13 Sheets—Sheet 5.
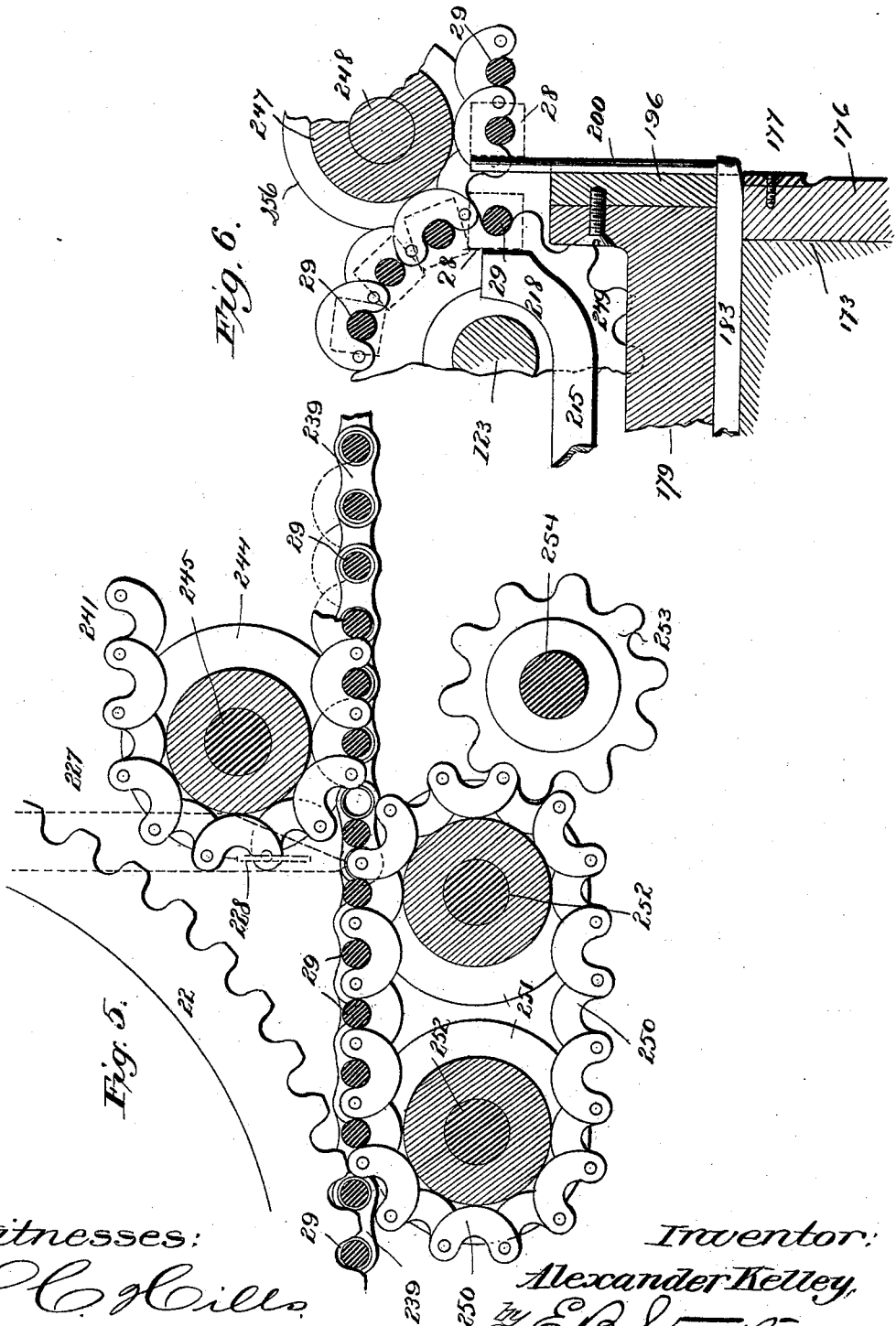
Witnesses:
L. C. Hills
E. H. Bond
Inventor:
Alexander Kelley,
by E. B. Stocking
Atty.

No. 606,994. Patented July 5, 1898.
A. KELLEY.
MATCH MAKING MACHINE.
(Application filed May 22, 1896.)
(No Model.) 13 Sheets—Sheet 6.

Witnesses:
L. C. Hills
E. H. Bond

Inventor:
Alexander Kelley,
by E. B. Stocking
Atty.

No. 606,994. Patented July 5, 1898.
A. KELLEY.
MATCH MAKING MACHINE.
(Application filed May 22, 1896.)
(No Model.) 13 Sheets—Sheet 7.
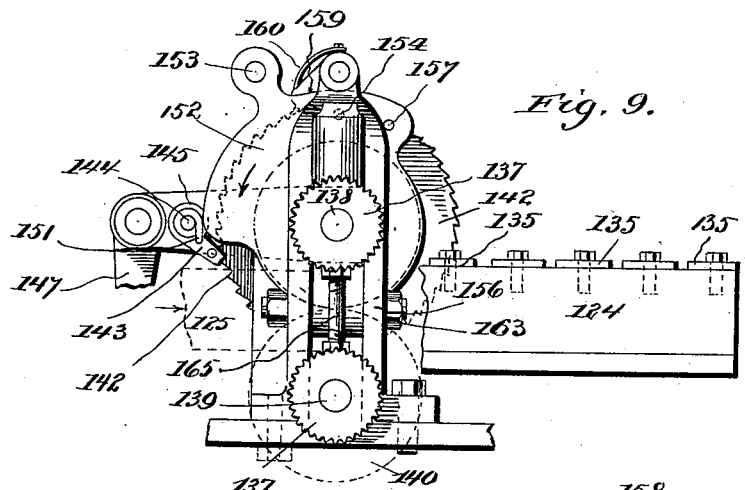
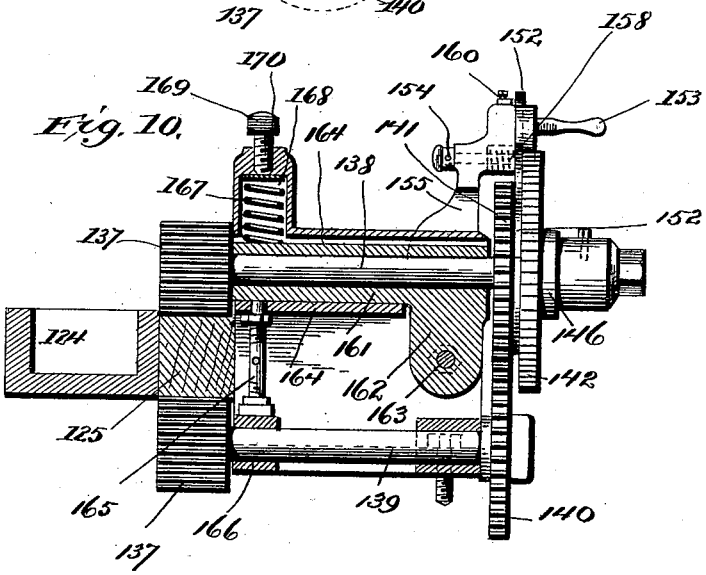
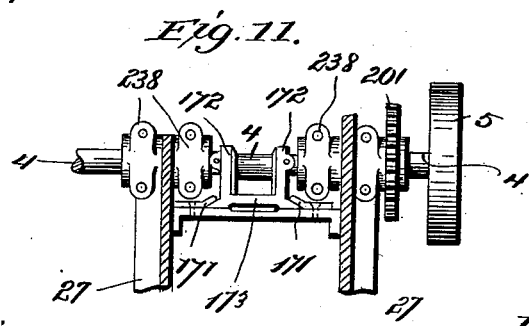
Witnesses: L. C. Hills, E. H. Bond.
Inventor: Alexander Kelley, by E. B. Stocking, Atty.
THE NORRIS PETERS CO., PHOTO-LITHO., WASHINGTON, D. C.

No. 606,994. Patented July 5, 1898.
A. KELLEY.
MATCH MAKING MACHINE.
(Application filed May 22, 1896.)
(No Model.) 13 Sheets—Sheet 8.
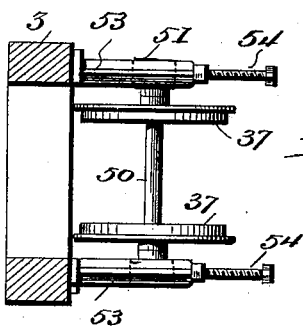
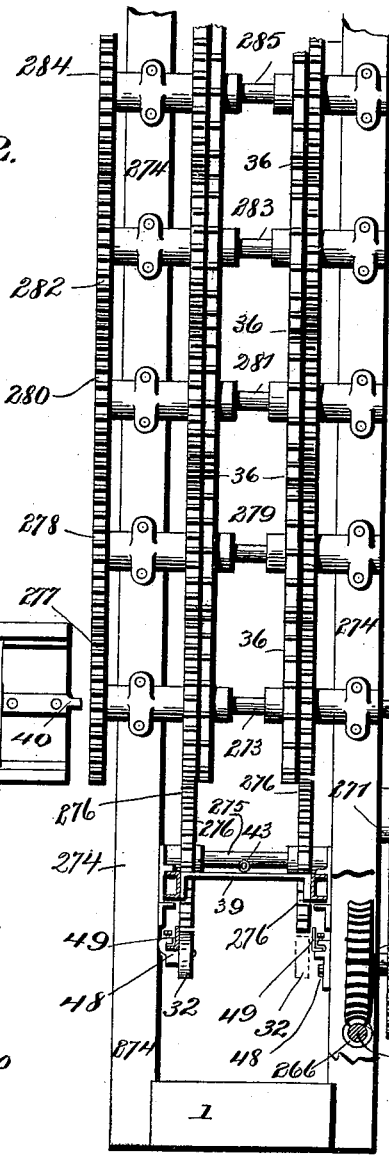
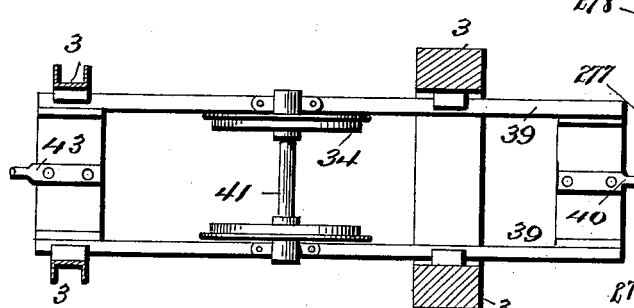
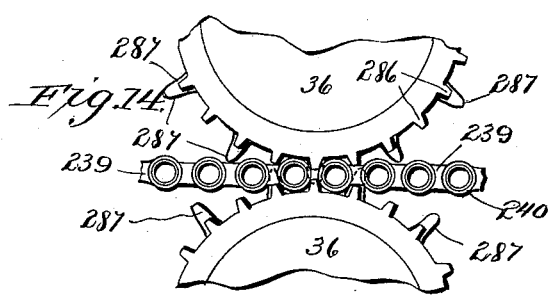
Witnesses:
L. C. Hills.
E. H. Bond.
Inventor:
Alexander Kelley,
by E. B. Stocking
Atty.

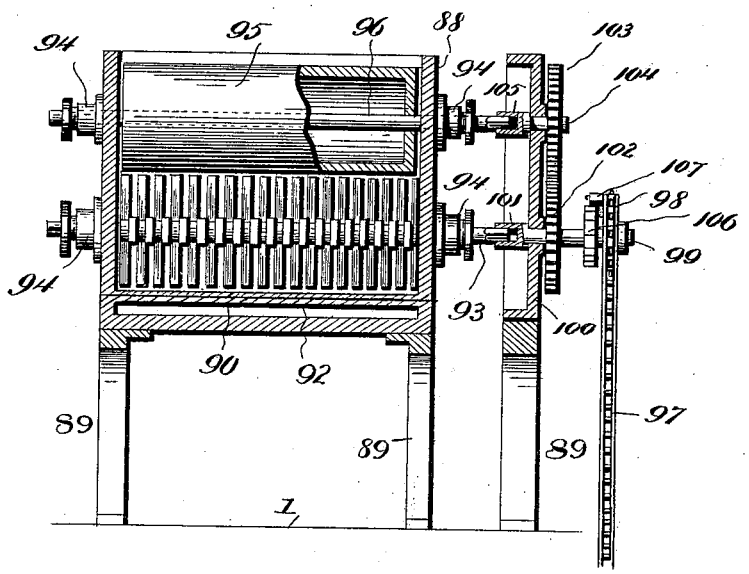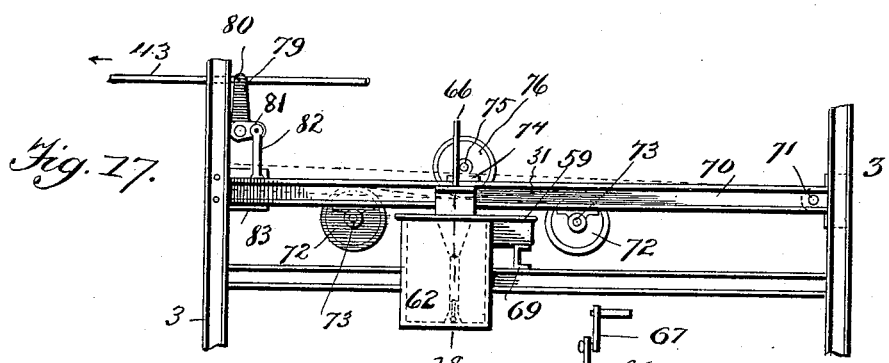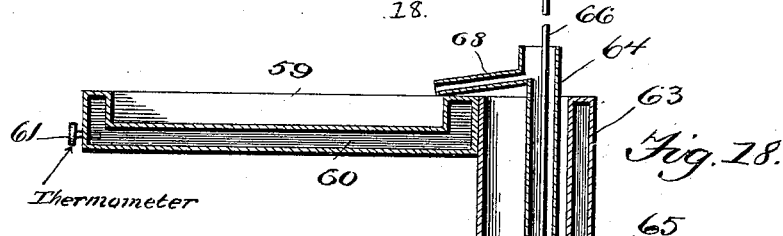

No. 606,994. Patented July 5, 1898.
A. KELLEY.
MATCH MAKING MACHINE.
(Application filed May 22, 1896.)
(No Model.) 13 Sheets—Sheet 10.
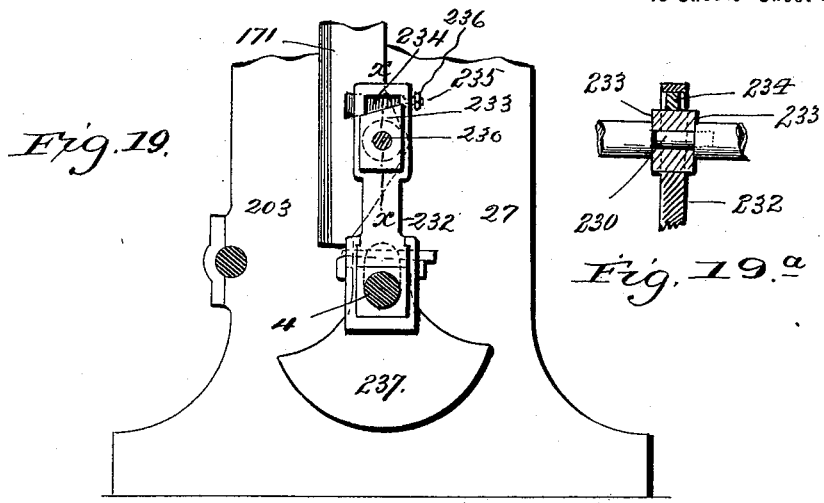
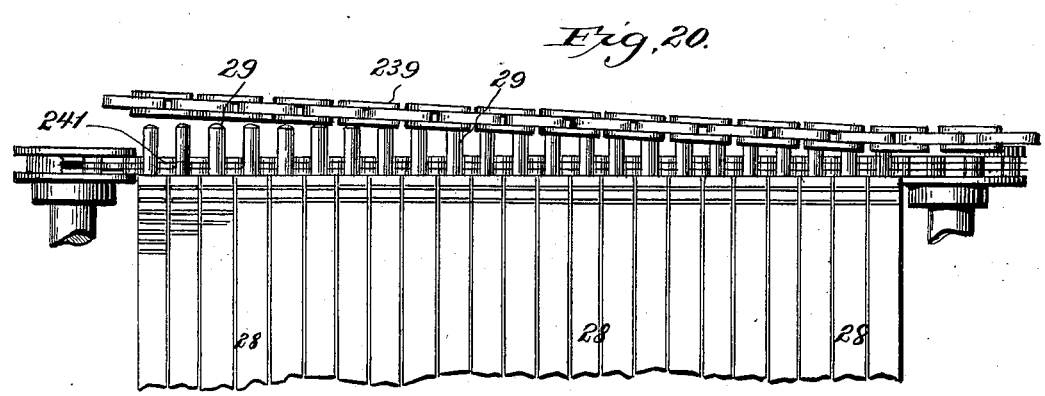
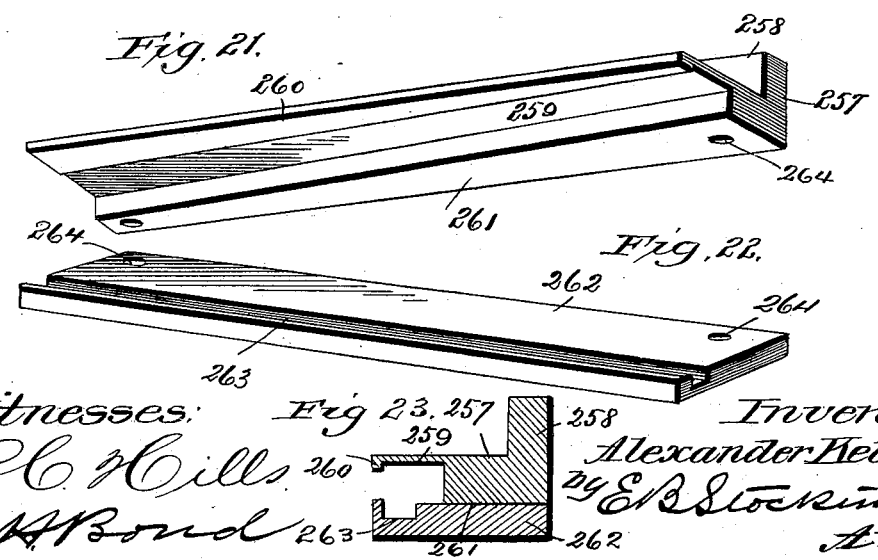

No. 606,994. Patented July 5, 1898.
A. KELLEY.
MATCH MAKING MACHINE.
(Application filed May 22, 1896.)
(No Model.) 13 Sheets—Sheet 11.
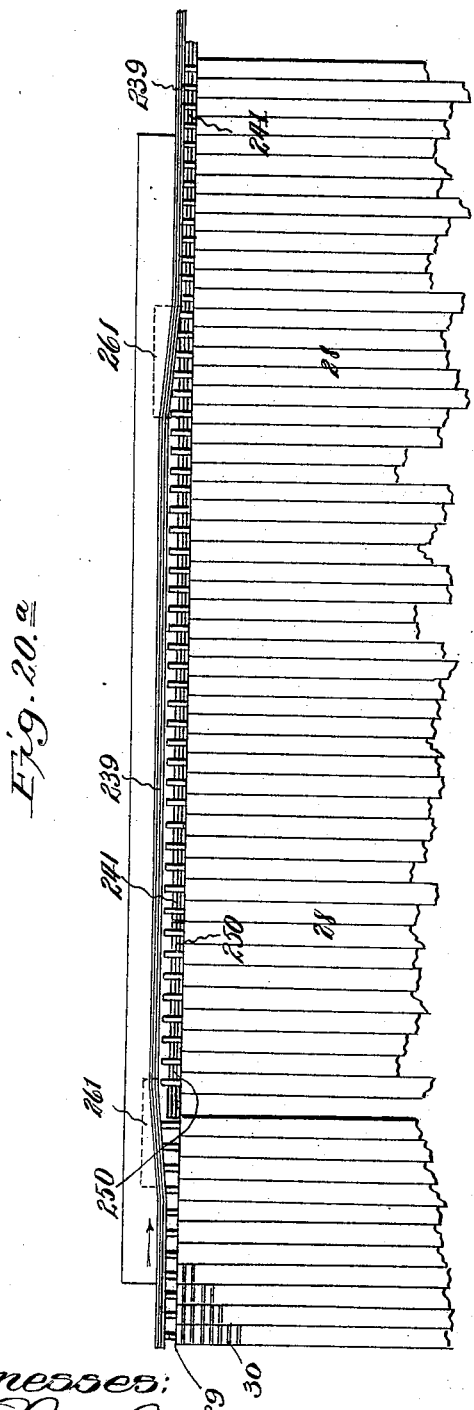
Witnesses:
L. C. Mills.
E. H. Bond.
Inventor:
Alexander Kelley,
by E. B. Stocking
Atty.

No. 606,994. Patented July 5, 1898.
A. KELLEY.
MATCH MAKING MACHINE.
(Application filed May 22, 1896.)
(No Model.) 13 Sheets—Sheet 12.
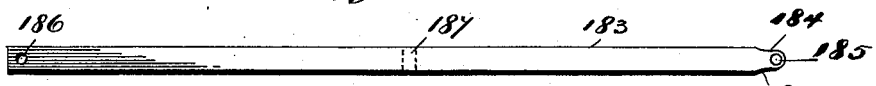
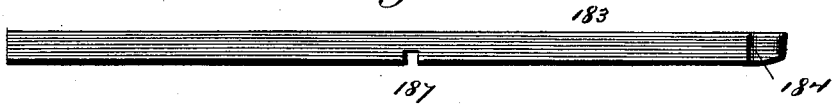
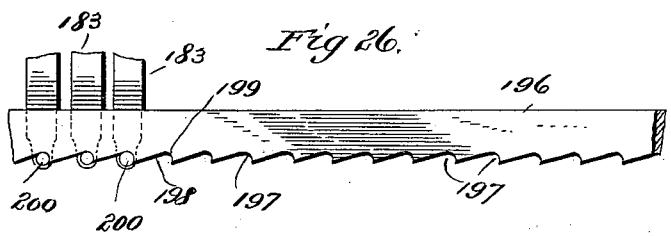
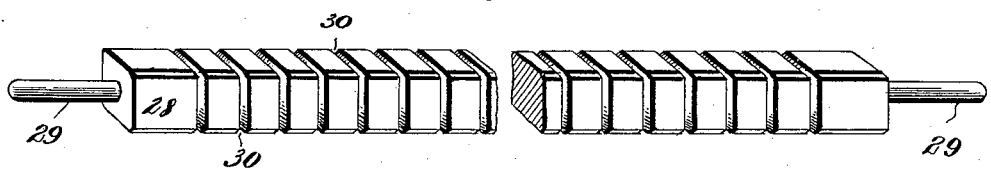
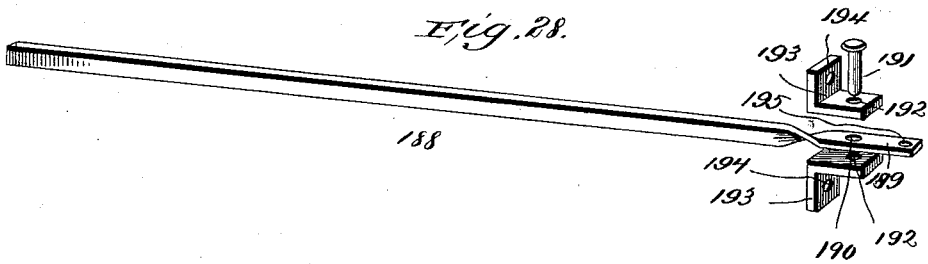
Witnesses
L. C. Hills
E. H. Bond
Inventor:
Alexander Kelley.
by E. B. Stocking
Atty.

No. 606,994. Patented July 5, 1898.
A. KELLEY.
MATCH MAKING MACHINE.
(Application filed May 22, 1896.)
(No Model.) 13 Sheets—Sheet 13.

Witnesses
L. C. Hills
Alfred T. Gage

Inventor:
Alexander Kelley,
by E. B. Stocking
Attorney.

THE NORRIS PETERS CO., PHOTO-LITHO., WASHINGTON, D. C.

UNITED STATES PATENT OFFICE.

ALEXANDER KELLEY, OF WILMINGTON, DELAWARE, ASSIGNOR, BY DIRECT AND MESNE ASSIGNMENTS, OF TWO-THIRDS TO WILLIAM B. CLERK, OF SAME PLACE, AND JOHN EDWARD ADDICKS, OF CLAYMONT, DELAWARE.

MATCH-MAKING MACHINE.

SPECIFICATION forming part of Letters Patent No. 606,994, dated July 5, 1898.

Application filed May 22, 1896. Serial No. 592,605. (No model.)

*To all whom it may concern:*

Be it known that I, ALEXANDER KELLEY, a citizen of the United States, residing at Wilmington, in the county of New Castle, State of Delaware, have invented certain new and useful Improvements in Match-Making Machines, of which the following is a specification, reference being had therein to the accompanying drawings.

This invention relates to certain new and useful improvements in match-making machines; and it has for its objects, among others, to provide a simplified machine having provision for a continuous movement in contradistinction to an intermittent one, the parts being so arranged that the stick-moving devices are continuously operated, the sticks being received thereby and discharged therefrom without any impediment or stoppage in the travel thereof.

I provide a construction whereby the taking up of the sticks, as well as their delivery from the carriers, is automatic, and by the peculiar disposition of the paraffining mechanisms and the devices for applying the composition the paraffin has been thoroughly absorbed by the stick and the latter practically dried before the sticks are presented to the mechanism which applies the composition.

I employ novel devices for actuating the bars which carry the sticks. I dispense with perforated plates for moving or carrying the sticks from the blocks from which they are formed to the carriers, as well as dispensing with the setters employed for the purpose of aiding the introduction of the sticks into the holes in the perforated plate.

I so construct my cutter that it not only severs the sticks from the block, but serves in itself solely as the means for conveying the sticks thus cut to the bars, the parts being so arranged that as the sticks are delivered to the bars the cutter recedes, so as to be disengaged from said sticks.

I provide for the supply of the composition to the receptacle therefor parallel with the line of travel of the carriers instead of at the end, as heretofore, whereby the composition is evenly distributed throughout the length of the receptacle, so as to be applied to the sticks evenly throughout the breadth of the machine.

I make provision for the disposition of the composition-applying devices at the extreme end of the machine, and the support for the lower roll, over which the carrying-bars pass, is mounted to slide and is controllable by means convenient to the operator, so as to be thrown back out of vertical line with the composition-receptacle, and thus to be readily moved out of harm's way in case a fire should occur at the composition-applying devices.

I provide a novel arrangement of carrier-chains, the main carrier-chain being for a portion of its length disposed at an angle with relation to the auxiliary chain and to the path traversed by the carrier-bars, so that the former is disengaged or thrown out of operative relation to the latter at a certain predetermined stage during its travel. I also provide for the ready removal or replacement of any of the cutters in case of breakage or injury thereto by the mere removal of a bar disposed transversely of the length of the cutters and serving to hold all of them in place. The feed-box and its accessories form also an essential element of the construction.

Novel means are provided for actuating the carrier-chains and the bars which grasp and move the sticks.

I aim further at improvements in the details of construction and in the make-up of the machine as a whole, whereby it is better adapted for the accomplishment of the work which it may be called upon to perform.

Other objects and advantages of the invention will hereinafter appear, and the novel features thereof will be particularly pointed out in the appended claims.

The invention is clearly illustrated in the accompanying drawings, which, with the numerals of reference marked thereon, form a part of this specification, and in which—

Figure 8:
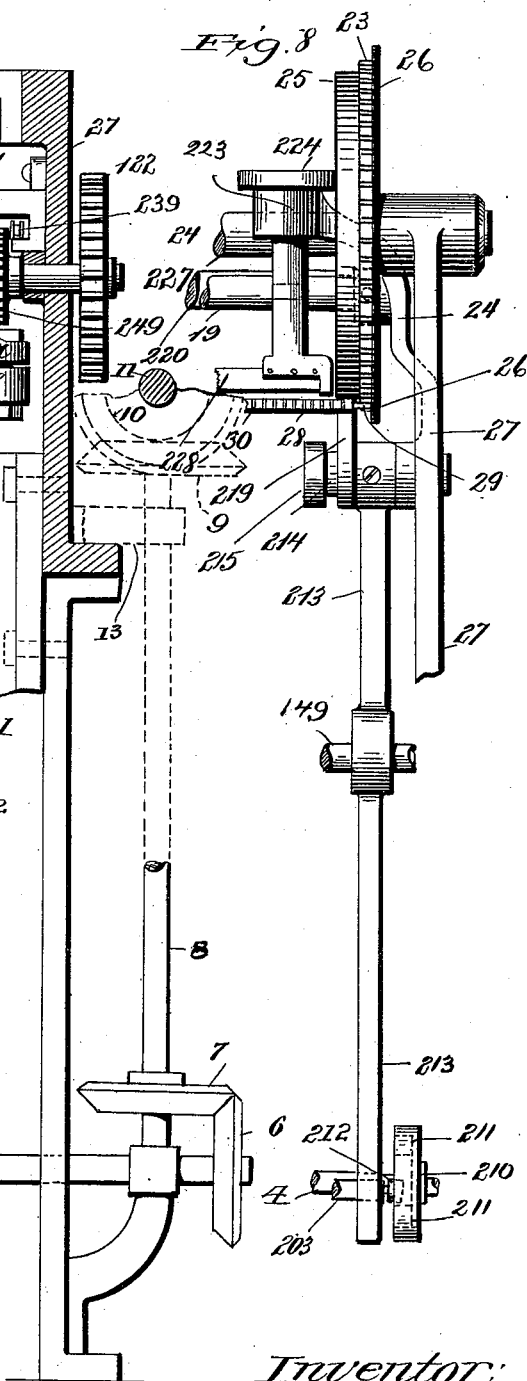
Figure 29:
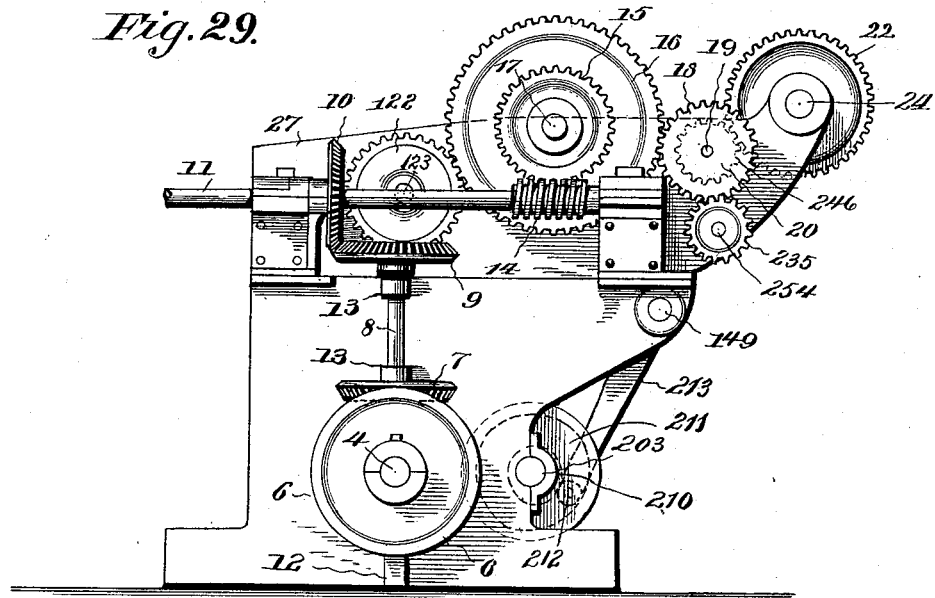
Figure 30:
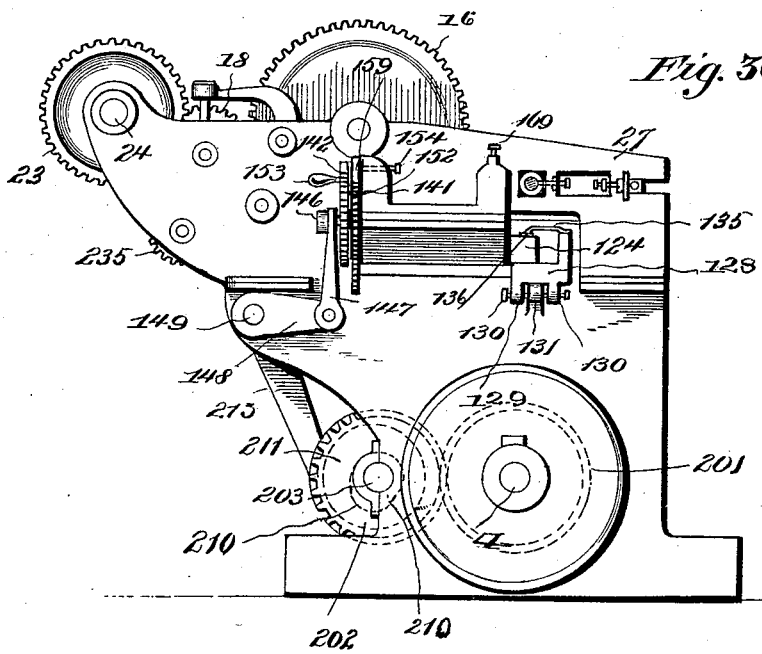

Figures 1 and 1ª, taken collectively, represent a side elevation of my improved match-making machine with portions broken away and parts removed for the sake of clearness. Figs. 2 and 2ª represent in plan, with parts in section and portions broken away, the mechanism for shifting the lower supportingrolls of the carrier-bars. Sheets 1 and 2, containing these two figures, are to be considered as one in order that the machine in its entirety may be better understood. Fig. 3 is a central vertical longitudinal section, on an enlarged scale, with portions broken away, showing the reciprocating head carrying the cutters, the knocker, the reciprocatory separator for the carrier-bars, and the main, auxiliary, and sub chains. Fig. 3ᵃ is a detail in elevation, showing the manner of supporting and adjusting the feed-box. Fig. 4 is a plan of Fig. 3 with portions broken away and parts in section and the chains, bars, guideway, and other parts removed. Fig. 5 is an enlarged detail, partly in elevation and partly in section, showing a portion of the main and the auxiliary chains and the subchain and their mode of operation. Fig. 6 is a vertical sectional detail showing a portion of the reciprocatory cutter-head, the knocker, and the point of transfer of the carrier-bars from the auxiliary chain to the main chain. Fig. 7 is a vertical cross-section on the line 7 7 of Fig. 4, looking in the direction of the arrows, with the carrier-bars and the chains shown in their relative positions. Fig. 8 is an enlarged detail in elevation of the separator and its actuating mechanism. Fig. 9 is an end view of the feed-box and feed mechanism. Fig. 10 is a substantially central vertical section through Fig. 9, with the shafts and gears shown in elevation. Fig. 11 is a plan of the mechanism for operating the reciprocatory cutter-head. Fig. 12 is an enlarged detail in plan, with parts in section, showing the means for taking up slack in the carrier, composed of the carrier-bars. Fig. 13 is a detail in plan, with parts in section, of a portion of the means for carrying and moving the lower portion of the endless chain and the carrier-bars. Fig. 14 is an enlarged detail of the double sprockets and a portion of the chain with which they coöperate. Fig. 15 is an elevation, with portions broken away and parts in section, showing the gears and sprockets for actuating the chains. Fig. 16 is an enlarged vertical section, on the line 16 of Fig. 1ᵃ, through the composition-vat, its agitator, and dipping-roll and the mechanism for actuating the same, a portion of the roll being broken away. Fig. 17 is an enlarged detail in elevation of the paraffin-pan and its accessories. Fig. 18 is a vertical cross-section, on the line 18 of Figs. 1ᵃ and 17, through the paraffin-tank receptacle and its pump. Fig. 19 is an enlarged detail in end elevation with parts in section, showing the connection between the crank-shaft and the reciprocatory cutter-head. Fig. 19ᵃ is a vertical section on the line X X of Fig. 19. Fig. 20 is a plan view, on an enlarged scale, showing the carrier-bars and the main and auxiliary chains and the relative positions thereof. Fig. 20ᵃ is a plan in diagram, showing the manner of transfer of the bars to and from the main chain. Fig. 21 is an enlarged perspective view of one portion of the guideway for the main chain. Fig. 22 is a similar view of the other portion of said guideway. Fig. 23 is a vertical cross-section of the guideway of the two parts shown in Figs. 21 and 22. Fig. 24 is a plan of one of the cutters. Fig. 25 is a side elevation of the same. Fig. 26 is a detail in plan of the strip that guides the sticks above the cutter-bars in their movement toward the carrier-bars, several of the cutter-bars also being shown in their relative positions. Fig. 27 is an enlarged perspective view of one of the carrier-bars removed and shown broken away. Fig. 28 shows in perspective the removable bar that holds the cutter-bars in place and also the means for securing said removable bar. Fig. 29 is a side elevation of the splint-cutting mechanism, looking from the opposite side to that shown in Fig. 1. Fig. 30 is a similar view of the opposite side of the mechanism.

Like numerals indicate like parts throughout the several views.

Referring now to the details of the drawings by numerals of reference, 1 designates the floor or foundation, and 2 the ceiling or top of the frame or support in which the machinery is set up.

3 are uprights designed for supporting the various parts of the machine, as will appear as the description proceeds.

4 is the main power-shaft, provided with a pulley 5 and designed to receive its motion from any suitable source of power. (Not shown.) On the opposite end of this shaft is a beveled pinion 6, meshing with a beveled gear 7 on a vertical shaft 8, which at its upper end carries a beveled gear 9, meshing with a beveled gear 10 on a horizontal shaft 11, arranged at right angles to the power-shaft 4, all as most clearly seen in Figs. 7 and 29. Shaft 4 is supported in suitable bearings in the frame of the machine and in the additional bearing 12, while the vertical shaft 8 is supported in suitable bearings 13, supported from the upright or vertical portion 3, as also seen best in Fig. 29. The shaft 11 carries a worm 14, which meshes with a worm-gear 15, keyed to the hub of the gear 16, carried by the shaft 17, mounted in suitable bearings transversely of the machine near the initial end. This gear 16 meshes with a smaller gear 18 on the shaft 19, mounted in suitable bearings in the frame parallel with the shaft 17, and on said shaft 19 are the two sprocket-driving gears 20 and 21, one near each end, as seen in Fig. 4, which are designed to mesh with the sprocket-gears 22 and 23, carried by the shaft 24, mounted in suitable bearings at the initial end of the machine, as seen in Figs. 3 and 4. The sprocket-gears 22 and 23 have upon their inner or adjacent faces the annular flanges 25, upon which the ends of the polygonal carrier-bars bear, while the pintles or portions thereof extended beyond the same work in the sprocket-teeth of the gears 22 and 23 and are confined between the outer flanges or hubs 26 thereof.

27 is the framework supporting these various shafts and the reciprocatory cutter-head, the separator, the knocker, and the means for actuating the same.

The carrier to which the sticks are delivered after being cut and by which they are carried, first, to the paraffin-applying devices, thence to the mechanism for applying the composition, and afterward through a sufficient space to permit of the drying of the composition before being delivered from the machine in a perfectly-dry state, is composed of the requisite number of bars, which in their preferred form are substantially rectangular in cross-section, as seen in Fig. 3 and in enlarged perspective in Fig. 27. These bars 28 are of proper length and provided at each end with the cylindrical extensions or pintles 29, said bars being provided by any well-known means, upon their various faces, with grooves, depressions, or the like 30, into which the sticks are received and by which they are held between two adjacent bars in a manner which will be hereinafter more clearly set forth. These bars are arranged parallel with each other, but each free for movement absolutely independent of the other. These bars, being entirely free of and disconnected from each other, are mounted for rotary movement upon their pintles as a center, and as each set is brought successively into operative position all four sides thereof are provided with the grooves, recesses, or depressions 30, the depressions, grooves, or recesses in the various bars being arranged at like distances, so that the grooves of the one bar come directly opposite those of another, and the grooves in the adjacent faces of two adjacent bars form openings into which the upper ends of the sticks or matches are deposited and by which they are held during the continued movement of the carrier composed of such bars. This rotation of the bars takes place at the point where the bars travel in a curved path—that is, at the point where they are brought into position to be acted upon by the pusher 218, as seen best in Fig. 6. At this point each bar is given a quarter-revolution, so that what was its upper face becomes the front vertical face in position to engage the match-splint. In passing over and around the sprocket-wheel 249 the top of the splint-holding bar is brought to the front at a point opposite the center of the sprocket, thus giving the bar a one-quarter revolution bodily, as clearly shown by dotted lines in Fig. 6. As the sticks are carried by the cutters hereinafter described in their vertical movement and placed in these grooves, no backer to the sticks is required, as in case where perforated plates are employed, and hence service of a setter, which is necessary in the employment of perforated plates, is dispensed with. The bars are carried by the mechanisms hereinafter described over a course designated in Figs. 1 and 1ª.

The carrier as a whole will be designated by the numeral 31 for convenience in following its course throughout the several Figs. 1 and 1ª, to which attention is now directed and from which it will be seen that the said carrier, composed of a requisite number of these bars, passes under the flanges 25 of the sprocket-gears 22 and 23, over antifriction-rollers 32, through the paraffin-applying devices, which will be more fully hereinafter set forth, thence around the rollers 33, arranged at the rear end of the machine, over the composition-applying devices, thence back over roller 34 and again forward over antifriction-rollers 32, over the pulley 35, thence back over more antifriction-rollers 32, through double sprockets 36, (a more minute description of which and their operation will be hereinafter given,) thence around the pulleys 37, back between other sprockets 36, around pulley 35, back again over antifriction-rollers 32, and around other pulleys 37, thence back again and around the upper pulley 35 and back again to the initial end of the machine and around pulley 38, thence down the initial end of the machine and under the flanges 25 of the sprocket-gears 22 and 23, all as clearly indicated in Figs. 1 and 1ª, antifriction-rollers 32 being provided along the entire course of the carrier to prevent sagging and undue friction thereof.

The rollers 33 and the rollers 34, which constitute the lower support for the endless carrier, are mounted upon sliding bars or a sliding frame 39. (Seen in Figs. 1ª, 2ª, and 13.) While this slide or sliding frame may be of any suitable or desired form, I have preferred in this instance to show it as composed of two short frames 39, connected by the rod or rods 40 for the sake of lightness and ease of operation, in one of which the rollers or pulleys 34 are mounted upon the shaft 41, as seen best in Fig. 13, while at the outer end of the other the rollers or pulleys 33 are mounted in independent hangers or brackets 42. The innermost frame 39 has connected therewith a rod 43, as seen in Figs. 1ª, 2ª, and 13, the other end of which is pivotally connected, as at 44, with a lever 45, pivotally mounted at one end, as at 46, and to some fixed part, as a timber 47, (see Figs. 1 and 2,) all so arranged that by movement of the said lever in the direction indicated by the arrow in Fig. 2 the frames, together with their pulleys or rollers 33 and 34 and of course the carrier mounted thereover, will be moved in the direction of the arrow in Fig. 1ª, so as to move the rollers 33 from over the composition-applying devices, as will be readily understood. This lever is under the control of and within convenient reach of the operator at all times, so that the sliding frames and the above-mentioned rollers may be moved toward the initial end of the machine in case of fire occurring at the composition-applying devices or in case of stoppage of the machine, in which instance it is desirable to so move the frame as to prevent contact of the sticks with the dipping-roll, which still continues to revolve. The slack is compensated for by the movement of the rollers 34, as will be readily understood.

The antifriction-rollers 32 are mounted in hangers 48, supported in or by the angle-irons or analogous means 49. (Seen best in Fig. 15.)

The rollers 35, 37, and 38, over which the endless carrier 31 passes, are mounted for adjustment, so as to compensate for the slack in the carrier, and in Fig. 12 I have shown an enlarged view of one set thereof to better illustrate this construction, and referring now to said figure, as well as to Figs. 1 and 1$^a$, it will be seen that the shaft 50, which carries said rollers, is journaled in boxes 51, mounted to slide in the slotted bearings 52 in the brackets 53, secured to the uprights 3, while set-screws or analogous means 54 are provided for moving said boxes in their slots, as may be required to compensate for the slack in the carrier.

It is deemed advisable to next describe the paraffin-applying devices and the devices for heating the sticks just before they are presented to such mechanism, and for this purpose attention is called to Figs. 1, 17, and 18.

In Fig. 1, 55 is a heater of any known construction supported on a platform or support 56 and provided at one end with a steam-inlet 57, designed for connection with any suitable source of steam, and at the opposite end with a steam-outlet 58. The sticks are heated by their passage directly over this heater, so that when they are presented to the paraffin-applying devices they are thoroughly heated and therefore in proper condition to receive and absorb the paraffin. The paraffin-applying devices comprise a tank 59, provided with a steam-jacket 60, which is preferably provided with a thermometer or gage 61 of any well-known or suitable form of construction, so that the temperature of the paraffin may be kept uniform. This paraffin-tank and its jacket are supported in any suitable manner in position adjacent to the heater 55, as shown in Fig. 1.

62 is a tank or receptacle adjoining the tank 59 and provided with a steam-jacket 63, which steam-jacket, as well as that of the tank 59, is designed to be kept sufficiently heated by steam received from any suitable source. (Not shown.) Within the tank 62 is a pump-cylinder 64, having suitable opening or openings at its lower end, affording communication between the same and the tank 62, and within this cylinder is mounted for vertical reciprocation the piston 65, the stem 66 of which is designed to be reciprocated by crank 67 and suitable connection with some means not shown and not deemed necessary to herein illustrate or describe. A spout 68 serves to conduct the paraffin from the pump-cylinder into the tank 59. The piston employed is or may be of any construction suitable for the purpose.

In Fig. 1 I have indicated the steam inlets and outlets for the jackets of the tanks 59 and 62. The paraffin-receptacle 59, its tank 60, and pump are supported upon suitable angle-irons or analogous supports 69, as indicated more clearly in Fig. 17.

70 is a bar pivotally mounted at one end, as at 71, on one of the uprights 3 or the bracket or lug projecting therefrom, and 72 are rollers on shafts 73, mounted in suitable bearings upon the under side of this bar, while upon the upper side of said bar is a bearing 74, in which is mounted a shaft 75, carrying a roller 76, which roller is arranged at substantially the center between the rollers 72 72, as shown best in Fig. 17, these rollers being so arranged that the carrier 31 in passing over the rollers 72 72 and under the roller 76 is deflected in its course from a straight line, so that the sticks carried by the bars of the carrier are depressed at this point to bring them into the paraffin-tank 59. The support 70 consists, preferably, of the two bars, as seen best in Fig. 2, and the rollers 72 72 and 76 bridge the space between them, as indicated, while 77 is a shaft mounted in suitable bearings or brackets 78 from an upright 3, as seen best in Fig. 2.

79 is an arm connected at one end with the shaft 77 and at its other end pivotally connected, as at 80, with the rod 43. (See Fig. 17.)

81 are crank-arms on the shaft 77 near its opposite ends, and these crank-arms are connected by links or analogous means 82 with the bars 70, (see Figs. 2 and 17,) so that when the rod 43 is moved in the direction of the arrow in Fig. 17 by means of the lever 45, which, as before described, moves the roller 33 from over the dipping-roll of the composition-applying devices, the support 70 is moved on its pivot, whereby its opposite end moves upward, carrying with it the rollers 72 72 and 76, and the ends of the sticks held in the carrier will be elevated out of the paraffin-bath, and in case of stoppage of the machine said sticks will not remain in the bath and become oversaturated. The free end of the support 70 is guided by the guides 83, mounted upon the upright 3, as indicated in Figs. 1 and 17.

84 is a hood arranged over the paraffin-applying devices, where it is supported in any suitable manner—as, for instance, by the hooks or rods or hangers 85, (seen in Fig. 1,) which depend from one of the angle-irons 49, upon which the antifriction-rollers 32 are mounted. From the apex of this hood extends a pipe 86, emptying into the pipe 87, which is designed to be connected with a suction-fan, (not shown,) all so arranged that the fumes from the paraffin-bath, which are detrimental to the production of a perfect match, are conducted away through the pipes 86 and 87 to the open air.

88 is a tank or receptacle mounted upon a suitable support 89, disposed at the rear end of the machine and beyond the roller-supports 35 of the carrier and beyond the end upright 3, and although the roller 33 is normally disposed in a vertical plane with this receptacle it is designed to be, as hereinbefore described, moved with its endwise-movable support, so as to be thrown beyond the plane thereof in case of fire or stoppage of the machine. This receptacle is designed to receive the pan or tank 90 for containing the composition. This pan may be preferably of the shape indicated in Fig. 1ª, although this is not essential. The material is designed to be supplied to the pan over the chute or guideway 91, which is disposed along and mounted upon a side of receptacle 88, so that the composition when supplied to the pan may be evenly distributed throughout its entire length. Where the composition-applying devices are disposed otherwise than at the end of the machine, it has heretofore been necessary to supply the composition thereto at the end of the tank or receptacle, in which case the material was not evenly distributed throughout the length of the pan and the sticks dipped therein at one end received more than those at the other.

92 is an agitator mounted within the lower portion of the pan, as indicated in Figs. 1ª and 16, this agitator being of any suitable form of construction, carried by a shaft 93, mounted in suitable bearings in the end walls of the receptacle 88, as indicated best in Fig. 16, and preferably provided with stuffing-boxes 94 at each end to form liquid-tight joints and prevent escape of the material at the journal-bearings.

95 is a dipping-roll mounted upon the shaft 96, supported in suitable bearings in the end walls of the receptacle 88 and provided with stuffing-boxes 94 for the same purpose as those heretofore described in connection with the shaft 93. This dipping-roll is mounted so that its lower surface moves within the composition in the pan 90, the direction of rotation being indicated by arrow in Fig. 1ª, and motion is imparted thereto in any suitable manner—such, for instance, as indicated in Fig. 16, in which 97 is a sprocket-chain designed to receive its motion from any suitable source, preferably by means not shown, but arranged beneath the floor or foundation 1, and this sprocket-chain passes over a sprocket-wheel 98 on a stub-shaft 99, mounted in suitable bearings in the frame 100, disposed adjacent to the receptacle 88 and its support 89, as indicated in Fig. 16, the said stub-shaft carrying at its inner end a socketed portion 101, in which the polygonal end of the shaft 93 is engaged, so that the shaft may be disengaged by endwise movement thereof when desired.

On the shaft 99 is a gear-wheel 102, which meshes with a gear-wheel 103 on a stub-shaft 104, mounted in a suitable bearing in the frame 100 and having a socketed portion 105, into which is designed to be engaged the polygonal portion of the shaft 96, so that separation thereof may be accomplished when desired. The shafts 93 and 96 are given motion in opposite directions, as indicated by the arrows in Fig. 1ª. On the shaft 99 is fast a ratchet 106, with which engages a pawl 107, pivotally mounted on the inner face of the sprocket-wheel 98, all as clearly shown in Fig. 16. This sprocket-wheel 98 is loosely mounted upon its shaft, so that by disengagement of the pawl 107 from the ratchet 106 the continued movement of the sprocket-wheel 98 will not impart movement to the shaft 99, and consequently the agitator and the dipping-roll remain stationary.

The space between the removable pan 90 and the inner wall of the receptacle 88 constitutes a water-jacket, to which water is supplied by the means indicated in Fig. 1ª, in which 108 is a supply-pipe for water from a tank or other suitable supply of not too high pressure, and this pipe communicates with a pipe 109, leading to the steam-trap 110, which is by preference an expansion-trap of known construction, into which the steam-pipe 111 is designed to supply steam, said pipe being connected to any suitable source of steam, and from this trap leads pipe 112, extending into the said water-jacket, while the pipe 113 affords communication between said water-jacket and the pipe 109.

114 is a blow-off valve, while 115 is the ordinary trap-valve. The operation of this device will be readily understood, and a detailed description thereof is not deemed necessary. It is thought merely sufficient to state that the circulation of hot water is kept up, so that the composition within the pan 90 will be maintained at proper temperature, a thermometer 116 being shown in Fig. 1ª for the purpose of indicating the temperature of the water within the jacket.

In order to remove all dust and dirt, as well as splinters and slivers, from the sticks after they are delivered to the carrier 31 and before they are presented to the paraffin-applying devices, I have provided the mechanism seen in Fig. 1, which comprises a conduit or pipe 117, designed to be connected with some suitable form of suction-fan or the like, (not represented,) and with which pipe connects a branch 118, which has its upper end disposed just in the rear of the reciprocating knives or cutters and over the feed-box, so that any dust, dirt, or splinters that may adhere to the sticks as they are presented to the bars of the carrier 31 will be automatically removed, while 119 is another conduit or pipe connecting with the conduit 117, and its upper end terminating in an enlargement 120, within which are arranged the brushes 121, mounted on suitable shafts and adapted to revolve within the said chamber or enlargement, as indicated by dotted lines in Fig. 1. These brushes revolve in contact with the sticks as the latter pass on with the carrier and remove any dust, dirt, or splinters that may perchance adhere thereto and have escaped the influence of the suction-pipe, so that all refuse and dust is removed from the sticks in order that they may be presented to the paraffin-applying devices in best possible condition.

124 is a feed-box into which the blocks 125 of wood are placed and fed beneath the cutters. The rear wall of this feed-box is inclined, as seen in Fig. 4. This feed-box is supported upon the plate or support 126, which has a depending portion 127, as best seen in Fig. 3.

128 is a casting having a horizontal portion engaged with the edge of the support 126 and preferably integral therewith and having the depending lug 129, as seen best in Fig. 3ᵃ. Through openings in each of the lugs pass the bolts 130, the ends of which are engaged in a bracket 131, projecting from the frame 27. Manipulation of these screws permits of the necessary adjustment of the feed-box and its support to and from the cutter-head. A bolt 132 (seen in Figs. 3ᵃ and 4) serves to adjust the feed-box and the support in the direction of the length thereof. It will thus be seen that the necessary adjustment of the box and its parts can be readily attained. Similar bolts 133 may be employed near the other end of the box, as indicated in Fig. 4.

134 is a support rising from the support 126, as seen best in Fig. 3, and secured to the upper face of this support are the springs 135, as seen clearly in Figs. 3 and 4, and the other ends thereof connected to the plate or bar 136, designed to bear upon the top of the block 125 and hold the same down in position to be acted upon by the cutter-bars.

137 are the feed-rollers, corrugated, as shown, and between which the block is received and by which it is designed to be fed. These feed-rolls are carried by the shafts 138 139, and on the other ends of these shafts are the gears 140 and 141, as seen best in Fig. 10, which gears are designed to mesh with each other, as indicated, and motion is imparted thereto by means of the ratchet 142, fast on the shaft 138 and engaged by the pawl 143, pivotally mounted, as at 144, on the arm 145, the hub 146 of which is fast upon the shaft 138, as seen in Figs. 4 and 10, and to the other end of this arm is connected the rod or link 147, the other end of which is connected with the horizontal arm 148, mounted on the shaft 149, extending transversely of the machine.

150 is a sleeve loosely mounted upon the outer portion of the shaft 149, as seen in Fig. 4. The pawl 143 is held to its work by a spring 151, as seen in Fig. 9.

152 is a plate mounted loosely upon the shaft 138 and provided with a handle 153, (see Figs. 4, 9, and 10,) and this plate has its upper portion mounted or disposed so that when the plate is turned in the direction of the arrow in Fig. 9 this portion will engage the pawl 143 and move it away from its engagement with the ratchet 142. A pin 154 is removably inserted through an opening in the lug or bracket 155, rising from the standard 156, and adapted to engage one of two openings 157 in the plate 152, so that when the pin is in the one opening—for instance, that in which it is engaged in Fig. 9—the plate is held out of engagement with the pawl 143; but when the plate is moved in the direction of the arrow in Fig. 9 and the pin engaged in the other opening 157 the plate will engage and move and hold the pawl 143 away from its engagement with the bracket 142. A spring 158, arranged within the socket or opening in the bracket 155, as indicated by dotted lines in Fig. 10, serves to hold the pin in engagement with the opening in the plate.

159 is a pawl engaging the ratchet 142 to prevent retrograde movement thereof. It is held to its work by a spring 160 bearing thereupon, as seen in Fig. 9. The shaft 138 is mounted in a bearing in the casting 161, having a depending portion 162, mounted on a pivot 163, and this casting is confined between the tubular portion 164, within which the casting has movement and by the inner sides of which it is limited in such movement.

165 is a jack or adjustable screw, arranged as shown in Figs. 9 and 10, supported upon the end bearing 166 of the roll 139 and passed through the under portion of the tubular casting 164 and bearing against the casting 161, so that by adjustment of this jack or screw the casting 161, which, as will be observed, forms the bearing or boxing for the roll 138, may be adjusted to regulate the space between the feed-rolls 137.

167 is a spring arranged within a socket 168, rising from the casting 164, as seen best in Fig. 10, the said spring bearing against the upper portion of the tubular casting 164 and serving to hold the same down with a sufficiently-yielding pressure, and the tension of this spring is regulated by means of a set-screw 169, bearing against the plate 170, arranged within this socket and seated upon the spring, all as clearly shown in Fig. 10.

The reciprocatory cutter-head and its accessories and the means for operating the same will now be described.

171 are slides or guideways in which the vertical portions 172 of the reciprocatory head slide. (See Figs. 7 and 11.) These vertical portions are connected near their upper ends by the transverse piece 173, and near the upper end there is an offset 174, in which is secured the trimming-knife 177. (Seen best in Figs. 3 and 6.) For sake of convenience I prefer to construct the upper portion of the cutter-head in two parts, and upon reference to Fig. 7 it will be seen that the lower portion has the lugs 178 and the upper portion 179 has lugs 180, and through these lugs pass the bolts 181, so as to detachably connect the two parts of the head together. The upper portion is provided with a plurality of grooves 182, extending in the direction of the length of the machine, and in which grooves are arranged the cutter-bars 183 or knives, the construction of which is best seen in Figs. 24 and 25. Each knife or cutter consists of a single piece of steel with its front or cutting end reduced in width, the opposite sides being concaved, as seen at 184, and the front face rounded, the front end being provided with an opening 185, disposed vertically and of a diameter corresponding to the desired diameter of the sticks to be cut, the edges of this portion being sharpened, as is usual in cutters or knives of this character. The concave opposite sides of the knives when a plurality of the same are operated together leave a series of scallops upon the cut edge of the stock. The stock is then fed so as to bring these scallops beneath the cutters in their next reciprocation, whereby substantially the entire body of the stock is utilized and the production of large pieces of waste material prevented.

The opposite end is preferably provided with an opening 186, as seen in Fig. 24, to aid in the removal of the knife or cutter when desired, and upon an edge, either the upper or under, extending transversely thereof, is a slot or groove or notch 187, the notches, grooves, or slots in all of the knives being the same distance from the end, so that when all are in position within the grooves of the cutter-head the sliding plate or bar 188 can be inserted and moved through all of these slots, grooves, or notches, and thus serve to retain all of the knives or cutters in position. This bar, which is disposed vertically, has one end bent or twisted to form a horizontal portion 189, which is provided with an opening 190 for the reception of the pin or bolt 191, which passes coincident with the openings 192 in the horizontal portions of the angle-plates 193, the vertical portions of which are provided with openings 194 for the reception of bolts, screws, or other means, by which they are secured in position on the reciprocating head. The horizontal portion of this bar is further provided with an opening 195 for the reception of a hook or other means by which it may be removed when desired. By these means it will be observed that while the knives or cutters are all securely held in their proper positions on the cutter-head any one of them can be removed by simply withdrawing the pin 191 from the bar 188 and withdrawing the said bar until the desired knife or cutter has been passed thereby or disengaged therefrom, when the cutter can be easily removed and repaired or a new one placed in its stead, and in case it should be desired to employ the same cutter which has been broken the same is reshaped at the end and sharpened and a notch, slot, or groove cut in its edges in such position as to become coincident with those of the other cutters and the repaired cutter then inserted in its groove in the cutter-head and the bar 188 replaced and retained in position, as will be readily understood.

To the front edge of the upper portion 179 of the reciprocating cutter-head is detachably fixed in any suitable manner the plate 196, as seen best in Fig. 6, the outer edge of which is grooved vertically, as shown best in Fig. 26, in which the grooves 197 are clearly illustrated and which are, as it will be observed, formed with an inclined wall 198, terminating in a curved or rounded portion 199, into which the match-sticks are received after they are cut by the cutter and the reciprocating head moved upward, the sticks after being cut being represented by the numeral 200. (See Figs. 3, 6, and 26.) The cutter-head is reciprocated as follows: On the crank-shaft 4 is a gear 201, which meshes with a gear 202 on a shaft 203, mounted in suitable bearings on the frame 27, as seen in Figs. 19 and 30.

Fast on the shaft 203 is a cam 210, the contour of which is seen best in Fig. 30, and in the cam-path 211 thereof is designed to move a pin or projection 212, carrying an antifriction-roller, said pin being carried by the lower end of the arm 213, pivotally mounted between its ends upon the shaft 149, while its upper end is pivotally mounted on the transverse pin 214, and upon the said pin 214 is mounted one end of the knocker-arm 215, which is mounted to move through a guide 216, suitably supported on the frame 27, and the free end of this knocker-arm is curved or bent upwardly, as seen at 217, and carries the knocker 218, which is arranged to engage the bars 28 of the carrier 31, for a purpose which will hereinafter appear and as indicated most clearly in Fig. 3. 219 is an arm mounted on the pin 214 and pivotally mounted upon the shaft 220, having its upper end extending horizontally, as at 221, and this horizontal arm is extended inwardly toward the center of the machine, as seen best in Fig. 4, it being understood that there is one of these arms upon each side of the machine, as seen in Fig. 4.

The free ends of the horizontal portions 221 of the above-mentioned arms are provided with the sockets 223, having caps 224, and within these sockets are arranged springs 225, bearing against the heads 226 of the separator or cleaner 227, the separators or cleaners being connected by the transverse bar 228 (see Figs. 3 and 4) and the lower ends of the cleaners or separators are tapered and pointed, as seen in Fig. 3, so as to readily enter between two of the bars 28 of the carrier 31. The heads 226 of the separators or cleaners rest upon the inwardly-turned flanges 229 of the lower wall of the sockets, and these heads are beveled or tapered, as seen clearly in Fig. 3, so as to permit of the necessary movement out of a vertical plane occasioned by the fact that the carrier 31 is a continuously-moving one, rendering it necessary for the separator to have a slight movement, as upon a pivot, during its action to avoid injury to or breakage of any of the parts.

The vertical portions 172 of the reciprocatory head are joined between their ends by the wrist-pin 230, which, as indicated in Fig. 7, has conical portions fitting corresponding bearings in said members 172 and receiving a nut 231 upon its end.

232 is a connecting-rod connecting the crank-shaft 4 with this wrist-pin 230, the upper end of the connecting-rod having a slot, in which is mounted a box or bearing 233, the upper face of which is beveled, as seen in Fig. 19, and a wedge-pin 234 is provided for holding the same securely in place and permitting of adjustment for wear, one end of said wedge-pin being extended, as seen at 235, and screw-threaded to receive a nut 236, whereby the same is adjusted to compensate for wear when necessary. The manner of connecting the rod 232 with the crank-shaft, while in this instance shown as being an ordinary strap and jib and key, may be varied as may be desired.

237 is a weight of proper size and of any desired shape, mounted upon that portion of the crank-shaft opposite the crank and serves as a counterbalance for the reciprocatory head. It will be understood how motion of the crank-shaft serves through the medium of the above connections to reciprocate the cutter-head. The bearings of the crank-shaft are designated in Fig. 11 by the reference-numeral 238.

239 is what I term the "main chain," and it is composed of links having hollow connecting-rivets 240, which serve an important function, as will hereinafter appear. This chain, which is endless, follows the course indicated by dotted lines in Figs. 1 and 1ª—the course taken by the carrier 31. The main chain comprises two endless chains, one upon each side of the machine. Its function and mode of operation will be more fully hereinafter described.

241 is what I term the "auxiliary chain." It is composed of curved links pivotally connected, as seen best in Fig. 5, there being one upon each side of the machine and designed to travel over the flanged rollers 242 on the shaft 243, the chains being confined between the flanged rollers, as will be understood, and at the other end the chains pass around the rollers 244 on a shaft 245, and at the same time is engaged and moved by the teeth of the sprocket-wheel 246 on the shaft 19, slightly out of vertical line with the shaft 245, as seen clearly in Fig. 3. At a point substantially in vertical line with the grooved plate 196, into which the match-sticks are received, the auxiliary chains, as well as the main chain and the carrier 31, are caused to dip or to take a downward path, as indicated in Fig. 3, by rollers 247 on a shaft 248, while upon a lower plane on the shaft 123 is a sprocket-wheel 249, all as clearly indicated in Fig. 3, said shaft 123 being driven by a gear 122, meshing with the large gear 18.

250 is the subchain, which is of comparatively short length, there being one upon each side of the machine similar to the main and auxiliary chains, this chain being composed of curved links similar to the auxiliary chains, the links being pivotally connected together and the chain mounted to move over the rollers 251 on the shafts 252, and this chain is engaged in its movement by the sprocket-teeth of a sprocket-wheel 253 on a shaft 254, as seen in Fig. 3. The function and operation of the auxiliary and sub chains will be fully explained as the description proceeds. The shafts 243 and 248 are mounted in suitable bearings designed to be adjusted by the adjusting-screws 255, (seen best in Fig. 3,) so that the chains may be adjusted or regulated to time them to act in proper relation with each other in order that the main chain will move so that its links will come into operative position with relation to the pintles 29 of the bars 28 at predetermined times. The rollers 247 are provided with an annular flange 256, disposed substantially centrally, as seen in Fig. 4, the portion of the roller upon one side of the flange receiving the auxiliary chain and the portion of the roller upon the other side of the flange receiving the main chain.

The sub and auxiliary chains are mounted for movement each in its own straight path at all times; but the main chain is caused to deviate from a straight path at predetermined points, so that at one time it is caused to move at an angle to the pintles of the bars 28, so as to be thrown out of operative relation and contact therewith and again thrown into such a path as to engage and take up the pintles of such bars.

Fig. 20 shows the main chain as it is being thrown out of its path so as to move away from and disengage the pintles 29 of such bars. The means for throwing the main chain off or away from the path of the pintles of the bars 28 is so disposed that the links of the main chain are disengaged from the pintles of such bars before the bars arrive at a point where they are acted upon by the separators or cleaners 227, so that at the time the said cleaners or separators are thrown down to engage between two of the bars the foremost bar will be free not only from the main but from the sub chain, so that the said forward bar may be pushed or forced forward into such position that the moving link of the auxiliary chain will engage the pintle of such bar as it is moved forward by the separator or cleaner. The means employed for again throwing the main chain into its path where the links thereof will engage the pintles of the bars 28 are located at such a point as to throw the chain inward into position to engage the pintles of the bars at the point where the sticks are delivered to such bars, at which time the bars are being moved forward by the auxiliary chain. While any suitable means may be employed for accomplishing this object, I have shown in Figs. 21, 22, and 23 what I at present consider an efficient device for such purpose. In these views, 257 is a bar or plate having means, as a flange 258, whereby it may be secured in position to the sides of the frame 27, and upon its under side having the longitudinal groove 259, the walls of which instead of running parallel with the outer edges of the plate or bar are inclined with relation thereto, as shown. One portion 260 upon one side of the groove is tapered in one direction, while the portion 261 upon the other side of said groove is tapered in the opposite direction, as indicated.

The plate or bar 262, which may be secured to the sides of the frame in any suitable manner, has near its edge a longitudinal groove or channel 263, as seen in Figs. 22 and 23. In practice these two plates or bars are secured together by bolts or other means passing through the openings 264 therein and the two plates or bars secured in their proper positions to and between the sides of the frame 27, as indicated in Fig. 7. The auxiliary chain moves in the channel 263, while the main chain is designed to move in the channel or groove 259, and by reason of the inclination of such channel it will be observed that the chain will be thrown inward or outward, according to the disposition of such channel, it being understood that the guide formed by the plates or bars 257 and 262 are arranged at one point, so that the inclination of the channel is outward from the path traversed by the auxiliary chain, so as to throw the main chain outward, while at the other point it is arranged in a reverse direction, so that the main chain is thrown from its angular course inward to move parallel with the auxiliary chain and take up the pintles of the bars 28. If desired, I may sometimes employ in connection with these guides the plates 265, as indicated in Fig. 7, and between which the bars 28 move and by which they are prevented from undue vertical movement in their passage through the machine and to keep them in their proper horizontal planes.

It now remains to describe the means employed for giving motion to the main chain, which is shown best in Fig. 15, in which will be seen a worm 266 on the shaft 11, which extends, as indicated by dotted lines in Figs. 1 and 1ª, to a point beneath the gears 36, and this worm meshes with a worm-wheel 267 on a stub-shaft 268, which carries a gear 269, meshing with a gear 270 on the stub-shaft 271, which in turn meshes with a gear 272 on the shaft 273. This shaft is mounted in suitable bearings in the uprights 274 and carries the lower double sprockets 36.

275 is a shaft carrying sprockets 276, arranged between the uprights 274, and are merely idlers for supporting the lower portion of the main chain. There are as many of these sets of double sprocket-wheels as may be necessary, according to the length of the carrier 31. In this instance I have shown five, and motion is imparted thereto from the shaft 273 as follows: On the other end of this shaft is a gear 277, which meshes with a gear 278 on the shaft 279, carrying the next higher set of double sprockets, and this gear 278 meshes with a gear 280 on the shaft 281 of the next higher set of sprockets, the gear 280 meshing with the gear 282 on the next higher shaft 283, while the gear 282 meshes with the gear 284 on the upper shaft 285. On each of the shafts 273, 279, 281, 283, and 285 are two double sprockets 36, one for each portion or side of the main chain, and although each sprocket is shown as composed of two separate wheels mounted to move together it is evident that they might be formed in one integral piece, although for the convenience in making I prefer two, as shown, one of each set—that is, the outer one is formed with short teeth 286, while the inner one is formed with longer teeth 287, there being, however, but half as many of the long teeth as there are of the short teeth, as seen more clearly in Fig. 14; but, as indicated in said Fig. 14, the long teeth of the set on the one shaft alternate with those of the long teeth on the other shaft, so that the pintle 29 of each bar 28 of the carrier 31 is engaged and actuated by a long tooth. The short teeth of these sprockets engage in the links of the chain and move the same along, while the long teeth engage behind the pintles of the bars 28 and assist them in their passage through the machine.

Various modifications in detail may be resorted to without departing from the spirit of the invention or sacrificing any of its advantages.

It now remains solely to describe the operation of the machine, with the parts constructed and arranged substantially as hereinbefore set forth.

The machine being started, the cutter-head is moved downward and the knives or cutters 183 remove from the block 125 each a stick or splint 200. As the cutter-head begins its upward stroke the splints or sticks which have been forced through the openings in the knives or cutters by the downward movement of the same are moved upward with the cutters and are delivered into the grooves, slots, or openings 30, between two adjacent carrier-bars 28, the foremost of said two bars being then under the control of a link of the auxiliary chain, as seen in Fig. 6, and the rearmost of said bars being at that moment free from both the auxiliary and main chains and in position to be actuated by the knocker 218, which is actuated at the moment the splint 200 has reached the limit of its upward movement, the said knocker bringing the rearmost of said two bars forward, so as to bring its pintle in position to be engaged by the ends of the link of the auxiliary chain, by which said bar is forced forward into engagement with the splints 200, which are held firmly by said two bars, so that as the cutter-head begins its downward movement the splints are firmly held by said bars and the cutters are disengaged therefrom and move downward to cut another series of splints from the block 125, which is automatically fed forward through the means of the devices hereinbefore described. The drop given the auxiliary chain at a point just in advance of the acting ends of the cutters or knives is for the purpose of disengaging the pintles of the bars from the chain, so that they are free to be actuated by the knocker, and also to leave a larger opening for the reception of the upper ends of the splints 200 as they are moved upward by the reciprocatory cutter-head. The splints being engaged between these bars are then moved forward by the carrier and are subjected first to the action of the suction through the pipe 118, which conveys the dust and dirt away, and in the further travel of the splints in the carrier they are subjected to the action of the brushes 121, as indicated best in Fig. 1, and which remove all adhering dust and dirt, as well as splinters that are not removed by the suction at the above-mentioned points. In the continued travel of the carrier 31 the splints are brought over the heater 55, in their passage over which they are sufficiently heated to place them in the best condition possible for receiving the paraffin, which is applied at the tank into which they are caused to dip by the deflection of the carrier under the roll 76, as indicated best in Fig. 1. The splints are here saturated with the paraffin and moved on by the carrier to the mechanism which applies the composition. The distance between the paraffin-applying devices and the mechanism which applies the composition is such as to allow the paraffin to become thoroughly absorbed by the pores of the splints and the latter thoroughly dried and cooled before they are presented to the composition-applying apparatus, so that a complete perfect head is formed. The composition is applied by the dipping-roll 95, and as the splints emerge from the action of this roll they are carried through the path indicated by dotted lines in Figs. 1 and 1ª and under the rollers 22 and to a point where the bars are disengaged from the main chain, when the completed matches drop from between the bars, and at this point the separator and cleaner 227 is brought into action to force ahead the foremost bar of the pair, so that its pintles will be taken up by the links of the auxiliary chain, and this separator serves also to remove from between the bars any matches that might perchance be held within the grooves thereof. The auxiliary chain controls the movement of the bars from the point just described—that is, when the bar is moved forward by the downward movement of the separator, at which time the links of the auxiliary chains engage the pintles of said bar and move it forward. At this time the main chain has by reason of the inclined guides, hereinbefore described and shown in detail in Figs. 21, 22, and 23, been thrown off from and out of the path of the pintles of the bars, as indicated in Fig. 20, so that from the point where the bars are first engaged by the auxiliary chain—that is, at the point just described, where the bars come under the influence of the action of the separator—until after such bars have taken the drop indicated in Fig. 3 and the splints have been delivered between two of the bars and the rearmost one of the pair pushed forward by the knocker the main chain, which has been gradually moved inward by a reverse arrangement of the inclined guides, takes up the pintles of the bars, which latter are then moved onward by the combined action of the main and auxiliary chains until the bars pass beyond the roller 242, over which the auxiliary chain passes, and from which point the bars are moved by the main chain alone until they are brought to the point beneath and in substantially vertical line with the shaft 24 of the rollers 22, at which point the main chain is thrown out, so that the pintles of the bars are disengaged therefrom when they are taken up by the links of the subchain 250, as indicated in Fig. 5, by which the bars are moved until they come to a point where they are acted upon by the separator 227, by which, as above described, they are conveyed by the link ends of the subchain to a point where they are taken up by the links of the auxiliary chain. The pintles of the bars are engaged in the concavities of the links of the auxiliary and subchains; but the said pintles are engaged in the hollow rivets of the links of the main chain, as indicated in Fig. 5 and also in Fig. 20, where as the chain is moved on it will be seen that said pintles are caused to engage in the said hollow rivets.

As hereinbefore described, the longitudinal bars 265, Fig. 7, may be employed to support the splint-carrying bars 28, while they are separated from the eyelets of the main chain.

Should a fire occur at the composition-applying devices at any time, all that is necessary for the operator to do is to move the lever 45 in the direction of the arrow indicated in Fig. 2, when the frames 39 and 40 will be moved in the direction of the arrow indicated in Fig. 1ª, so that the rollers 33 will be moved in the same direction and out of vertical line with the composition-applying devices, so that all portions of the machine are moved to a point where they are free from liability of injury by fire, and this without stopping the machine or interfering with its operation.

The completed matches may be delivered into a chute or any other suitable receptacle provided therefor or any devices for conducting the matches away to a filler or boxer or other receptacle or means. (Not herein shown.)

The operation is a continuous one, the splints being delivered to the carriers and by them conveyed to the paraffin-bath and thence to the composition-applying devices, thence through the course indicated and to the auxiliary chain, and then dropped from between the bars and the latter moved on to receive another lot of splints without any stoppage of the machine or attention on the part of the operator. The chains and other parts are all so timed as to come into operative positions at proper intervals. There is no breakage or bending of the splints, and the heads are perfect and regular in their outline. The composition is applied evenly throughout the entire width of the machine, and the distance between the grooves or depressions in the bars is such that no two heads can come in contact with each other.

While I have frequently used the word "splints," it is to be understood that this word means either the common wood splints, wax tapers, or the body portion of the match, be it of any material whatever, so long as it is capable of being received, carried, and delivered by the carriers herein shown and described.

Having thus described my invention, what I claim, and desire to secure by Letters Patent, is—

1. In a match-making machine, the combination of a series of splint-engaging bars, carrier mechanisms adapted to successively engage said bars, and means independent of said mechanisms to transfer bars from one to another, and separate the bars; substantially as specified.

2. In a match-making machine, a series of disconnected bars, between adjacent ones of which splints are to be held, moving in a curved path in combination with means for controlling the rotation of said bars; substantially as specified.

3. In a match-making machine, a carrier embodying a plurality of disconnected parallel bars capable of independent rotary movement combined with means for giving the same a continuous movement while receiving, carrying and delivering matches, substantially as specified.

4. In a match-making machine, a carrier embodying a plurality of disconnected independently-rotatable bars, combined with means for giving the same a continuous movement, and devices for feeding splints to such carrier while in motion; substantially as described.

5. In a match-making machine, a carrier embodying a plurality of disconnected independently-rotatable bars, combined with means for giving the same a continuous movement, devices for feeding splints to said carrier while in motion, and means for separating the bars of the carrier during their movement; substantially as described.

6. In a match-making machine, a carrier embodying disconnected match-holding bars, means for carrying them in an endless circuit, and means for connecting them to travel during a portion of said circuit in a fixed parallel clamping relation; substantially as specified.

7. In a match-making machine, a carrier embodying bars disconnected from each other and capable of rotary movement, means for causing them to move in an endless circuit, and means for connecting them to travel during a portion of said circuit in a fixed parallel clamping relation; substantially as specified.

8. In a match-making machine, a carrier embodying independently-rotatable, disconnected bars mounted to travel in an endless circuit, having pintles, and splint-receiving grooves upon their faces, combined with means engaging said pintles to move the bars to cause their rotation; substantially as specified.

9. In a match-making machine, a carrier embodying disconnected, independently-rotatable bars having pintles, combined with means engaging said pintles to move the carrier; substantially as specified.

10. In a match-making machine, a carrier embodying disconnected, independently-rotatable bars having pintles, combined with means engaging said pintles to move the carrier, and means for transferring said pintles from one moving means to another; substantially as specified.

11. In a match-making machine, the combination with a carrier embodying disconnected independently-rotatable bars having pintles, of means for moving said carrier, having openings to receive said pintles; substantially as specified.

12. In a match-making machine, the combination with a carrier embodying disconnected independently-rotatable bars having pintles, of means for moving said carrier, having openings to receive said pintles, and means for moving the same away from the carrier to disengage the pintles from said openings; substantially as specified.

13. In a match-making machine, a carrier embodying disconnected independently-rotatable bars, combined with the main carrying-chains and an independent auxiliary chain for moving said carrier; substantially as specified.

14. In a match-making machine, a carrier embodying disconnected independently-rotatable bars, combined with the main carrying-chains and auxiliary chain, and independent subchains for moving said carrier; substantially as specified.

15. In a match-making machine, a carrier embodying disconnected independently-rotatable bars in a parallel clamping relation, combined with the main carrying-chains and auxiliary chain, and means for delivering the carrier from one to the other of such chains; substantially as specified.

16. In a match-making machine, a carrier embodying disconnected independently-rotatable bars, combined with the main carrying-chains and auxiliary chain, and a subchain, and means for delivering the carrier-bars from one to the other; substantially as specified.

17. In a match-making machine, a carrier embodying disconnected independently-rotatable bars combined with the main carrying-chains and auxiliary chain, and a subchain, means for delivering the carrier-bars from one to the other, and means for throwing the main chains out of the path of the pintles of the bars of the carrier; substantially as specified.

18. In a match-making machine, the combination with the carrier embodying disconnected independently-rotatable bars, of auxiliary chains and main chains, and means for horizontally deflecting the latter away from the path traversed by the pintles of the carrier-bars; substantially as specified.

19. In a match-making machine, the combination with the carrier embodying disconnected independently-rotatable bars, of auxiliary chains, main chains, and means for horizontally deflecting the latter away from the path traversed by the pintles of the carrier-bars, and means for horizontally deflecting the said main chains into operative relation with said pintles; substantially as specified.

20. In a match-making machine, the combination with a carrier embodying disconnected bars mounted to travel in endless circuit and having pintles, of a chain having hollow rivets forming the pivots of the chain and adapted to receive said pintles of the carrier; substantially as specified.

21. In a match-making machine, the combination with a carrier embodying disconnected bars mounted to travel in endless circuit and having pintles, of a chain having hollow rivets forming the pivots of the chain and adapted to receive said pintles of the carrier, and a guide for deflecting the said chain from its straight path; substantially as specified.

22. In a match-making machine, the combination with a carrier embodying disconnected bars mounted to travel in endless circuit, of a main chain having hollow rivets forming the pivots of the chain, and an auxiliary chain having curved links; substantially as specified.

23. In a match-making machine, the combination with a carrier embodying disconnected bars mounted to travel in endless circuit, of a main chain having hollow rivets forming the pivots of the chain, and an auxiliary chain having curved links, and means for delivering the carrier-bars from one chain to the other; substantially as specified.

24. In a match-making machine, the combination with a carrier embodying disconnected bars mounted to travel in endless circuit, of a main chain having hollow rivets forming the pivots of the chain, an auxiliary chain having curved links, means for delivering the carrier-bars from one chain to the other, and a subchain having curved links; substantially as specified.

25. In a match-making machine, the combination with a carrier embodying disconnected bars, of a main chain having hollow rivets, an auxiliary chain having curved links, means for delivering the carrier-bars from one chain to the other, a subchain having curved links, and a reciprocatory separator arranged at a point where the carrier-bars leave the said chain; substantially as specified.

26. In a match-making machine, the combination of a carrier embodying disconnected bars having pintles, a main chain having hollow rivets to receive said pintles, an auxiliary chain having curved links to engage said pintles, means for throwing the main chain off from engagement with said pintles, and a subchain mounted to act upon said pintles as they are thrown off by the main chain; substantially as specified.

27. In a match-making machine, the combination of a carrier embodying disconnected bars having pintles, a main chain having hollow rivets to receive said pintles, an auxiliary chain having curved links to engage said pintles, means for throwing the main chain off from engagement with said pintles, a subchain mounted to act upon said pintles as they are thrown off by the main chain, and a reciprocatory device mounted to act upon the bars at the time they are thrown off by the subchain, substantially as specified.

28. In a match-making machine, the combination of a carrier embodying disconnected bars having pintles, a main chain having hollow rivets to receive said pintles, means for throwing the main chain off from engagement with the pintles, a subchain mounted to act upon said pintles as they are thrown off by the main chain, a reciprocatory device mounted to act upon the bars at the time they are thrown off by the subchain, and means for throwing the main chain into operative contact with said pintles; substantially as specified.

29. In a match-making machine, the combination of a carrier embodying disconnected bars having pintles, combined with a chain for engaging the pintles, and means for causing a drop of said bars in a vertical plane each independent of the other during their passage through the machine; substantially as specified.

30. In a match-making machine, the combination of a carrier embodying disconnected bars having pintles, combined with a chain for engaging the pintles, means for causing a vertical drop of said bars in succession each independent of the other during their passage through the machine, and a positively-operated device for engaging the bars after they drop to force them forward; substantially as specified.

31. In a match-making machine, the combination of a carrier comprising a series of disconnected, match-receiving bars having pintles and traveling in an endless circuit, a main chain and auxiliary chain, and a subchain, each independent of the other and arranged to act upon the pintles of the carrier-bars; substantially as specified.

32. In a match-making machine, the combination of a carrier comprising a series of disconnected, match-receiving bars having pintles and traveling in an endless circuit, main chains, auxiliary chains, and subchains, each independent of the other and arranged to act upon the pintles of the carrier-bars, and a sprocket-wheel for engaging and moving the subchains; substantially as specified.

33. In a match-making machine, the combination of a carrier comprising a series of disconnected, match-receiving bars having pintles and traveling in an endless circuit, main chains, auxiliary chains, and subchains, each independent of the other and arranged to act upon the pintles of the carrier-bars, a sprocket-wheel for engaging and moving the subchains, and a movable device for transferring the bars from the subchains to the auxiliary chains; substantially as specified.

34. In a match-making machine, the combination of a series of disconnected, match-receiving bars having pintles and traveling in an endless circuit, main chains, auxiliary chains, and subchains, each independent of the other and arranged to act upon the pintles of the carrier-bars, a sprocket-wheel for engaging and moving the subchains, a movable device for transferring the bars from the subchains to the auxiliary chains, and means for moving the main chains out of and into the path of the pintles of the carrier-bars; substantially as specified.

35. In a match-making machine, a chain composed of links provided with hollow rivets forming the pintles of said chain, combined with a series of disconnected match-receiving bars arranged to travel in an endless circuit; substantially as specified.

36. In a match-making machine, a chain composed of links connected by hollow rivets, combined with a series of disconnected match-receiving bars traveling in an endless circuit and having pintles at their ends to engage in said hollow rivets; substantially as specified.

37. In a match-making machine, the combination with a carrier moving in a curved path, comprising carrier-bars rectangular in form and having transverse grooves upon their various sides, and means for imparting a partial rotation thereto in the curved path of the carrier, substantially as specified.

38. In a match-making machine, a carrier-bar rectangular in form and having transverse grooves upon its various sides, and pintles at its ends; substantially as specified.

39. In a match-making machine and as elements of an endless carrier, rectangular bars having transverse grooves upon their various faces, and pintles at their ends, each bar being disconnected from the others and mounted for rotary movement upon its pintles; substantially as specified.

40. In a match-making machine, the combination with a reciprocatory cutter, an endless carrier movable at right angles thereto and embodying a series of disconnected, match-receiving bars, means for causing them to drop vertically each independently of the other, and a knocker mounted for reciprocation for engaging the rear of said bars and to advance them to grasp a splint between the same and the next forward bar; substantially as specified.

41. In a match-making machine, the combination of a reciprocatory cutter for severing and delivering the splints with a carrier composed of independent bars, and with means for moving the same, and devices for causing a drop of the bars, and a knocker for moving the same forward at a point where the splints are delivered thereto; substantially as specified.

42. In a match-making machine, the combination of a continuously-moving carrier embodying a series of disconnected, match-receiving bars mounted to travel in an endless circuit, auxiliary chains and main chains mounted for movement with the bars of the carrier during a portion only of its travel, and means for throwing the main chains out of operative relation with the carrier; substantially as specified.

43. In a match-making machine, the combination of a continuously-moving carrier embodying a series of disconnected, match-receiving bars mounted to travel in an endless circuit, auxiliary chains and main chains mounted for movement with the bars of the carrier during a portion only of its travel, means for throwing the main chains out of operative relation with the carrier, and subchains constructed and arranged to actuate the carrier while it is free from the influence of the main and auxiliary chains; substantially as specified.

44. In a match-making machine, the combination of a continuously-moving carrier embodying a series of disconnected, match-receiving bars mounted to travel in an endless circuit, auxiliary chains and main chains mounted for movement with the bars of the carrier during a portion only of its travel, means for throwing the main chains out of operative relation with the carrier, subchains constructed and arranged to actuate the carrier while it is free from the influence of the main and auxiliary chains, and means for transferring the carrier-bars from the subchains to the auxiliary chains; substantially as specified.

45. In a match-making machine, the combination of a carrier embodying disconnected bars arranged to travel in an endless circuit, a main chain, an independent auxiliary chain, a subchain constructed and arranged to move the carrier when the latter is not under the influence of the main or auxiliary chains, and an oscillatorily-mounted, reciprocatory device for transferring the bars of the carrier from the subchain to the auxiliary chain; substantially as specified.

46. In a match-making machine, the combination of a carrier embodying disconnected bars, a main chain, an independent auxiliary chain, a subchain constructed and arranged to move the carrier when the latter is not under the influence of the main or auxiliary chains, an oscillatorily-mounted, reciprocatory device for transferring the bars of the carrier from the subchain to the auxiliary chain, and means for causing a drop in the bars of the carrier at a point where the splints are supplied thereto; substantially as specified.

47. In a match-making machine, the combination of a carrier embodying disconnected bars, a main chain, an independent auxiliary chain, a subchain constructed and arranged to move the carrier when the latter is not under the influence of the main or auxiliary chains, an oscillatorily-mounted, reciprocatory device for transferring the bars of the carrier from the subchain to the auxiliary chain, means for causing a drop in the bars of the carrier at a point where the splints are supplied thereto, and a reciprocatory device for engaging the bars as they are dropped; substantially as specified.

48. In a match-making machine, the combination of a carrier mounted to travel in an endless circuit, main chains, independent auxiliary chains, subchains constructed and arranged to move the carrier when the latter is not under the influence of the main or auxiliary chains, an oscillatorily-mounted, reciprocatory device for transferring the bars of the carrier from the subchains to the auxiliary chains, means for causing a drop in the bars of the carrier at a point where the splints are supplied thereto, a reciprocatory device for engaging the bars as they are dropped, and means for moving the main chains onto and off the pintles of the bars of the carrier; substantially as specified.

49. In a match-making machine, the combination with a carrier embodying a series of disconnected, match-receiving bars having pintles and mounted for movement in an endless circuit, of main chains and auxiliary chains, and means for timing said chains with relation to each other; substantially as specified.

50. In a match-making machine, the combination with a carrier embodying disconnected bars, having pintles, of auxiliary chains having curved links to engage said pintles, with means for deflecting said chains in their course, and a sprocket-wheel mounted to engage the pintles of the carrier at a point where said chains are deflected; substantially as specified.

51. In a match-making machine, the combination with a carrier embodying disconnected bars having pintles, of auxiliary chains having curved links to engage said pintles, with means for deflecting said chains in their course, a sprocket-wheel mounted to engage the pintles of the carrier at a point where said chains are deflected, and a knocker mounted to engage said bars as their pintles leave said sprocket-wheel; substantially as specified.

52. In a match-making machine, the combination with the carrier composed of disconnected bars having pintles and mounted to move in an endless circuit, of chains for engaging said pintles, means for deflecting said chains in their path during their travel, a sprocket-wheel for engaging the pintles at a point where the chains are deflected, means for delivering the splints between two of the bars where the chains are deflected, and means for engaging the rearmost of the bars between which the splints are grasped to move the same forward; substantially as specified.

53. In a match-making machine, the combination of a plurality of cutters having transverse notches, a bar arranged transversely of the cutters and engaging said notches, and means for removably holding one end of the bar in position; substantially as specified.

54. In a match-making machine, the combination of a plurality of cutters having transverse notches, a removably-mounted bar slidingly engaged in said notches, having its main portion vertically disposed and its outer end horizontally disposed and provided with an opening for the reception of means to facilitate its removal; substantially as specified.

55. In a match-making machine, the combination with a carrier embodying a series of disconnected bars mounted to travel in an endless circuit, of a separator mounted at one end for oscillatory movement, and means for reciprocating said separator vertically; substantially as specified.

56. In a match-making machine, the combination with a carrier embodying disconnected bars mounted to travel in an endless circuit, of a separator mounted at one end for oscillatory movement, means for reciprocating said separator vertically, and a spring bearing upon the head of said separator; substantially as specified.

57. In a match-making machine, the combination with a continuously-moving carrier composed of disconnected bars, of a pivoted arm having a socket at one end, a spring arranged within said socket, a separator having a head arranged within the socket and beneath the spring, said head being beveled; substantially as specified.

58. In a match-making machine, the combination with the carrier embodying a series of disconnected bars mounted to travel in an endless circuit, and the main chain, of a guide for said chain, having a channel with inclined walls for deflecting said chain laterally from a straight path; substantially as specified.

59. In a match-making machine, the combination with a carrier embodying a series of disconnected match-receiving bars mounted to travel in an endless circuit, of auxiliary chains, main chains and guides having a channel for the auxiliary chains, and a channel with inclined walls for deflecting the movement of the main chains from a straight path; substantially as specified.

60. In a match-making machine, the combination with a carrier embodying a series of disconnected match-receiving bars mounted to travel in an endless circuit, of auxiliary chains, main chains and guides having channels for the auxiliary chains, and channels with inclined walls for deflecting the movement of the main chains from their straight path, and guide-bars for the carrier to maintain the parallel relation thereof; substantially as specified.

61. In a match-making machine, a series of disconnected match-receiving bars mounted to travel in an endless circuit, a chain for moving said bars, and means for disengaging said chain from said bars, substantially as specified.

62. In a match-making machine, the combination of a series of disconnected match-receiving bars mounted to travel in an endless circuit, and a series of independent chains for moving said bars, and means for disconnecting said chains from said bars; substantially as specified.

63. The combination of a series of disconnected match-receiving bars mounted to travel in an endless circuit, a series of independent chains for engaging said bars and moving them continuously while receiving, carrying and delivering matches, and means for engaging and disengaging said chains and bars; substantially as specified.

64. The combination of a series of disconnected match-receiving bars having pintles and mounted to travel in an endless circuit, a series of independent chains for engaging and moving said bars, and means for deflecting one of said chains to cause it to move out of and afterward into the path of the pintles of said bars; substantially as specified.

65. The combination of a series of disconnected match-receiving bars, and means for causing them to move in an endless circuit in a parallel clamping relation, embodying a plurality of bar-carrying devices, and means for substituting one of said devices for the other; substantially as specified.

66. In a match-making machine, the combination with the endless carrier and the composition-applying devices, of means located at the front of the machine for moving the lower supporting-roll of the carrier in a longitudinal plane away from the composition-applying devices; substantially as specified.

67. In a match-making machine, the combination with the carrier and its moving mechanism comprising a lower end roll at the extreme rear end of the machine, a slidingly-mounted support therefor, and means located at the front of the machine for sliding said support, of a composition-applying apparatus arranged beneath said end roll; substantially as specified.

68. In a match-making machine, the combination with the carrier and its moving mechanism comprising a lower end roll at the rear end of the machine, and a slidingly-mounted support therefor, of a composition-applying apparatus beneath said end roll, a paraffin-bath at a distance from said composition-applying apparatus, and means operated from the front of the machine for deflecting the carrier in said paraffin-bath; substantially as specified.

69. The combination with the endless carrier and the paraffin-bath, and means for deflecting the carrier into the same, of the composition-applying apparatus, and means located at the front of the machine for simultaneously moving the lower end roll which supports the carrier away from the composition-applying apparatus, and for actuating the devices which deflect said carrier at the paraffin-bath; substantially as specified.

70. In a match-making machine, the combination with a carrier embodying disconnected bars mounted to travel in an endless circuit, the paraffin-bath and the pivoted support with its rollers for deflecting the carrier into said bath, of means located at the front of the machine for moving said support upon its pivot and the lower supporting-roller for the endless match-carrying devices mounted for movement lengthwise of the machine and connected with said means; substantially as specified.

71. In a match-making machine, the combination with the carrier and the splint-supplying devices, of an exhaust-pipe, and rotary brushes therein to act upon said splints after they have been delivered to the carrier; substantially as specified.

72. In a match-making machine, the combination of a chain and a plurality of bars having pintles and mounted for movement with said chain, and a sprocket-wheel having long and short teeth arranged in different lateral planes; substantially as specified.

73. In a match-making machine, the combination with a chain and a carrier comprising a plurality of disconnected match-receiving bars having pintles and mounted to move in an endless circuit, of a sprocket-wheel having long and short teeth arranged in different lateral planes; substantially as specified.

74. In a match-making machine, the combination with a chain and a carrier comprising bars having pintles, of shafts parallel with said bars, and sprocket-wheels on said shafts having long and short teeth, with the long teeth of the wheels on one shaft arranged alternately with those of the wheels on the other shaft; substantially as specified.

75. In a match-making machine, the combination with a carrier embodying a series of disconnected bars having pintles and mounted to travel in an endless circuit, and chains having links with hollow rivets, of sprocket-wheels having long teeth to engage said pintles, and short teeth to engage between the links of the chains; substantially as specified.

76. In a match-making machine, the combination with the carrier embodying a plurality of disconnected match-receiving bars mounted to move in an endless circuit, and the composition-applying devices, of a sliding frame carrying a supporting-roll for said carrier in line with the dipping-roll of the composition-applying devices and another supporting-roll mounted on the other end of said frame, and over which the carrier passes, and means for moving said frame and the said rollers, whereby the end roll is moved away from the dipping-roll without interfering with the operation of the machine, substantially as specified.

77. In a match-making machine, the combination with a continuously-moving carrier comprising a plurality of disconnected match-receiving bars mounted to move in an endless circuit, of means for supplying splints thereto, means for applying paraffin to the splints, means for applying the composition to the ends of the splints, and means for delivering the splints from the carrier during the movement of the same; substantially as specified.

78. In a match-making machine, the combination with the endless carrier, of a composition-applying apparatus disposed at the end of the machine beyond the lowermost end roll of the carrier-moving mechanism, and a supply-chute at the rear side thereof whereby the composition may be delivered to such apparatus parallel with the shaft of the dipping-roll thereof; substantially as specified.

79. In a match-making machine, the combination with the continuously-moving carrier comprising disconnected bars, of an oscillatory arm and connections with said arm for giving an intermittent movement to the vertically-reciprocating separator, and an oscillatory mounting for said separator; substantially as specified.

80. In a match-making machine, the combination with an endless carrier comprising disconnected bars, of an oscillatory arm, an oscillatorily-mounted vertically-reciprocatory separator, and a horizontally-reciprocatory knocker mounted for actuation by said arm; substantially as specified.

81. In a match-making machine, a carrier comprising disconnected bars, a vertically-disposed oscillatory arm, and means connected therewith for giving an intermittent movement to the feed-rolls for moving the block, and an oscillatorily-mounted vertically-reciprocatory separator operatively connected with said arm; substantially as specified.

82. In a match-making machine, the combination with a carrier comprising disconnected bars, of a vertically-disposed oscillatory arm, a vertically-reciprocatory separator mounted at its upper end for oscillation, a horizontally-disposed knocker, connections with said arm for actuating the vertically-reciprocatory separator and the horizontally-disposed knocker; substantially as specified.

83. In a match-making machine, the combination with a carrier comprising disconnected bars, of a vertically-reciprocatory separator mounted at its upper end for oscillatory movement, a vertically-disposed, oscillatory arm, connections therewith for actuating the vertically-reciprocatory separator, a horizontally-disposed knocker, and feed-roll-actuating devices; substantially as specified.

84. In a match-making machine, the combination with a feed-roll and its shaft, of a ratchet on said shaft, a pivotally-mounted pawl engaging the ratchet, and a plate loosely mounted on the shaft of the roll for engaging said pawl to hold it out of contact with the ratchet, and a removable pin adapted to be passed through an opening in said plate into some fixed part of the frame for holding the plate in its adjusted position; substantially as specified.

85. In a match-making machine, the combination with a feed-roll and its shaft, of a ratchet on said shaft, a pivotally-mounted pawl engaging the ratchet, and a plate loosely mounted on the shaft of the roll for engaging said pawl to hold it out of contact with the ratchet, a removable pin adapted to be passed through an opening in said plate into some fixed part of the frame for holding the plate in its adjusted position, and an oscillatory arm loose on the shaft of the feed-roll and carrying said pawl; substantially as specified.

86. In a match-making machine, the combination with a feed-roll and its shaft, of a ratchet on said shaft, a pivotally-mounted pawl engaging the ratchet, a plate loosely mounted on the shaft of the roll for engaging said pawl to hold it out of contact with the ratchet, a removable pin adapted to be passed through an opening in said plate into some fixed part of the frame for holding the plate in its adjusted position, an oscillatory arm loose on the shaft of the feed-roll and carrying said pawl, and a vertically-disposed oscillatory arm connected with and adapted to actuate the arm carrying the pawl; substantially as specified.

87. In an organized machine for the purpose described, the combination of the devices for severing the match-splints and delivering them to a carrier, means for applying composition to said splints, a carrier embodying a plurality of disconnected match-receiving bars mounted to travel in an endless circuit, means for moving the carrier, devices for actuating the carrier-moving means, and mechanism for feeding the material to the cutters, substantially as specified.

88. In an organized machine for the purpose described, the combination of devices for severing the match-splints and delivering them to a carrier, means for applying composition to said splints, a carrier embodying a plurality of disconnected match-receiving bars mounted to travel in an endless circuit, means for moving the carrier, devices for actuating the carrier-moving means, mechanism for feeding the material to the cutters, and means for separating the bars of the carrier at predetermined points; substantially as specified.

89. In an organized machine of the character described, the combination of a carrier embodying a plurality of disconnected match-receiving bars mounted to travel in an endless circuit, main chains, auxiliary chains and subchains for giving the necessary movements thereto, means for forming and feeding the match-splints to the carrier, means for separating the bars of the carrier at predetermined points, and mechanism for applying composition to the ends of the said splints; substantially as specified.

90. In an organized machine of the character described, the combination of a continuously-moving carrier embodying a plurality of disconnected match-receiving bars mounted to travel in an endless circuit, main chains, auxiliary chains and a subchain for giving the movements to such bars, means for transferring the bars from one chain to the other, means for applying the composition to the splints, and means for separating the bars of the carrier at predetermined periods; substantially as specified.

91. In an organized machine of the character described, the combination of a continuously-moving carrier embodying disconnected bars mounted to travel in an endless circuit, main chains, auxiliary chains and subchains for giving the movements to such bars, means for transferring the bars from one set of chains to the other, means for applying the composition to the splints, means for separating the bars of the carrier at predetermined periods, and means for throwing the main chains laterally into and out of operative relation with the bars of the carrier; substantially as specified.

92. In an organized machine of the character described, the combination of a continuously-moving carrier embodying disconnected bars, a main chain, an auxiliary chain and a subchain for giving the movements to such bars, means for transferring the bars from one chain to the other, means for applying the composition to the splints, means for separating the bars of the carrier at predetermined periods, means for throwing the main chain into and out of operative relation with the bars of the carrier, and means for deflecting the carrier in its path at a predetermined point; substantially as specified.

93. In an organized machine of the character described, the combination of a continuously-moving carrier embodying disconnected bars, a main chain, an auxiliary chain and a subchain for giving the movements to such bars, means for transferring the bars from one chain to the other, means for applying the composition to the splints, means for separating the bars of the carrier at predetermined periods, means for throwing the main chain into and out of operative relation with the bars of the carrier, means for deflecting the carrier in its path at a predetermined point, and means for bodily moving a bar independent of the others at a point where the carrier is deflected, substantially as specified.

94. In an organized machine of the character described, the combination of a carrier embodying disconnected bars mounted for rotary movement and for successive movement in an endless circuit, main, auxiliary and subchains each independent of the other for actuating said carrier-bars, means for imparting motion to said chains, and means for throwing the main chains into and out of operative relation with the bars; substantially as specified.

95. In an organized machine of the character described, the combination of a carrier embodying disconnected bars mounted for rotary movement and for successive movement in an endless circuit, main, auxiliary and subchains each independent of the other for actuating said carrier-bars, means for imparting motion to said chains, means for throwing the main chains into and out of operative relation with the bars, and means for causing a deflection of the carrier in its travel; substantially as specified.

96. In an organized machine of the character described, the combination of a carrier embodying disconnected bars mounted for rotary movement, main, auxiliary and sub chains each independent of the other for actuating said carrier-bars, means for imparting motion to said chains, means for throwing the main chains into and out of operative relation with the carrier-bars, means for causing a deflection of the carrier in its travel, and means for separating said bars at predetermined periods; substantially as specified.

97. In an organized machine of the character described, the combination of a carrier embodying disconnected bars mounted for rotary movement, main chains, auxiliary and sub chains each independent of the other for actuating said carrier-bars, means for imparting motion to said chains, means for throwing the main chains into and out of operative relation with the bars, means for causing a deflection of the carrier in its travel, means for separating said bars at predetermined periods, and a reciprocatory knocker for positive engagement with the bars at a point where they are deflected, substantially as specified.

98. In an organized machine of the character described, the combination of a carrier embodying disconnected bars mounted for rotary movement, main chains, auxiliary chains and subchains each independent of the other for actuating said carrier-bars, means for imparting motion to said chains, means for throwing the main chains into and out of operative relation with the bars of the carrier, means for causing a deflection of the carrier in its travel, means for separating said bars at predetermined periods, a reciprocatory knocker for positive engagement with the bars at the point where they are deflected, and means for transferring the bars from the subchains to the auxiliary chains; substantially as specified.

99. In a match-making machine, a series of disconnected bars, between adjacent ones of which splints are to be held, endless chains for moving the bars in a curved path, sprockets coöperating with said chains, and a guide for controlling the rotation of the bars in said path; substantially as specified.

100. In a match-making machine, a series of disconnected bars, between adjacent ones of which splints are to be held, endless chains for moving the bars in a curved path, and sprockets coöperating with said chains; substantially as specified.

101. In a match-making machine, a series of disconnected bars, between adjacent ones of which splints are to be held, and endless chains for moving the bars in a curved path; substantially as specified.

102. In a match-making machine, a series of disconnected bars, between adjacent ones of which splints are to be held, and sprockets adapted to receive and carry said bars in a curved path; substantially as specified.

103. In a match-making machine, the combination with sprockets, of a series of disconnected bars between adjacent ones of which splints are to be held, the latter having pintles adapted to ride in the teeth of said sprockets and to be moved thereby in a curved path; substantially as specified.

104. In a match-making machine, a series of disconnected bars, between adjacent ones of which splints are to be held, means for moving said bars, means for causing said bars to travel in a curved path, and means for securing the presentation of the clamping-faces of said bars toward each other; substantially as specified.

105. In a match-making machine, the combination of a series of bars, between adjacent ones of which splints are to be held, a chain or carrier therefor, means for disengaging said bars from the latter, and means for controlling the rotation of said bars while being disengaged; substantially as specified.

106. In a match-making machine, the combination of a series of splints engaging bars, between adjacent ones of which splints are held, a chain or carrier therefor, a rotary carrier device for disengaging said bars from the latter, and means for controlling the rotation of the bars when carried by said rotary device; substantially as specified.

107. In a match-making machine, the combination of a series of splint-engaging bars, between adjacent ones of which splints are held, a chain or carrier therefor, means for disengaging said bars from the carrier, means to control the rotation of the bars when being so disengaged, and means for reëngaging said bars with the carrier; substantially as specified.

In testimony whereof I affix my signature in presence of two witnesses.

ALEXANDER KELLEY.

Witnesses:
L. P. WHITAKER,
E. H. BOND.